(12) United States Patent
Karamcheti et al.

(10) Patent No.: US 8,996,796 B1
(45) Date of Patent: Mar. 31, 2015

(54) SMALL BLOCK WRITE OPERATIONS IN NON-VOLATILE MEMORY SYSTEMS

(71) Applicant: Virident Systems Inc., Milpitas, CA (US)

(72) Inventors: Vijay Karamcheti, Palo Alto, CA (US); Ashish Singhai, Cupertino, CA (US); Shibabrata Mondal, Bangalore (IN); Swamy Gowda, Bangalore (IN)

(73) Assignee: Virident Systems Inc., Milpitas, CA (US)

( * ) Notice: Subject to any disclaimer, the term of this patent is extended or adjusted under 35 U.S.C. 154(b) by 143 days.

(21) Appl. No.: 13/842,940

(22) Filed: Mar. 15, 2013

(51) Int. Cl.
*G06F 12/00* (2006.01)
*G06F 12/12* (2006.01)

(52) U.S. Cl.
CPC .................................... *G06F 12/121* (2013.01)
USPC .................... 711/103; 711/159; 711/E12.084

(58) Field of Classification Search
None
See application file for complete search history.

(56) References Cited

U.S. PATENT DOCUMENTS

| | | | |
|---|---|---|---|
| 6,895,490 B1 * | 5/2005 | Moore et al. | 711/203 |
| 7,613,870 B2 * | 11/2009 | Bartley et al. | 711/103 |
| 8,055,873 B2 * | 11/2011 | Chu et al. | 711/170 |
| 8,352,673 B2 * | 1/2013 | Chu | 711/103 |
| 8,626,987 B2 * | 1/2014 | Jung et al. | 711/103 |
| 8,688,896 B2 * | 4/2014 | Nakamura et al. | 711/103 |
| 2014/0281138 A1 * | 9/2014 | Karamcheti et al. | 711/103 |

OTHER PUBLICATIONS

Yuval Cassuto et al., Codes for asymmetric limited-magnitude errors with application to multi-level flash memories, www.paradise.caltech.edu_papers_etr088.*

* cited by examiner

*Primary Examiner* — Sean D Rossiter
(74) *Attorney, Agent, or Firm* — Fish & Richardson P.C.

(57) ABSTRACT

A first portion of an asymmetric memory is configured as temporary storage for application data units with sizes corresponding to a small memory block that is smaller than the size of a logical write unit associated with the asymmetric memory. A portion of the remaining asymmetric memory is configured as a reconciled storage for application data units with varying sizes. A first application data unit is received for writing to the asymmetric memory. Based on computing the size of the first application data unit as corresponding to the small memory block, the first application data unit is written to the temporary storage. Upon determining that a threshold is reached, a memory write operation is performed for writing the application data units from the temporary storage to the reconciled storage. The application data units written to the reconciled storage are removed from the temporary storage.

31 Claims, 8 Drawing Sheets

SMALL BLOCK WRITE OPERATIONS IN NON-VOLATILE MEMORY SYSTEMS

TECHNICAL FIELD

This document generally relates to small block write operations in non-volatile memory systems.

BACKGROUND

Computer systems typically use memory modules for storing data. Some of the memory modules are realized by memory cards that include non-volatile computer memory, such as flash memory.

SUMMARY

The present disclosure describes methods, systems and devices for performing write operations of small and ultra-small blocks of data to non-volatile memory devices using a log-based structure.

In one aspect, a first portion of an asymmetric memory is configured as a temporary storage for application data units with sizes corresponding to a small memory block that is smaller than the size of a logical write unit associated with the asymmetric memory. The asymmetric memory includes memory devices in which latency of read operations is different from the latency of write operations. A portion of the remaining asymmetric memory is configured as a reconciled storage for application data units with varying sizes.

A first application data unit is received for writing to the asymmetric memory. A size of the first application data unit is computed. Based on computing the size of the first application data unit, it is determined that the first application data unit corresponds to the small memory block, wherein a small memory block includes application data units with sizes within a certain size limit. Based on determining that the first application data unit corresponds to a small memory block, the first application data unit is written to the temporary storage, which includes application data units with sizes corresponding to the small memory block.

An amount of data writing to the temporary storage is ascertained. The amount of data is compared to a pre-determined threshold for writing the application data units stored in the temporary storage to the reconciled storage. It is determined whether the amount of data has reached the threshold. Based on determining that the amount of data has reached the threshold, a memory write operation is performed on the reconciled storage for writing the application data units stored in the temporary storage to the reconciled storage. The application data units that are written to the reconciled storage are removed from the temporary storage.

Implementations may include one or more of the following features. The asymmetric memory may include a flash-based memory system.

A second application data unit may be received for writing to the asymmetric memory. A size of the second application data unit may be computed. It may be determined that the second application data unit is larger than a small memory block based on the computed size. The second application data unit may be written directly to the reconciled storage based on determining that the second application data unit is larger than a small memory block.

A third application data unit may be received for writing to the asymmetric memory. A size of the third application data unit may be computed. It may be determined that the third application data unit corresponds to a small memory block based on the computed size. The third application data unit may be written to the temporary storage based on determining that the third application data unit corresponds to a small memory block.

Configuring a portion of the asymmetric memory as the temporary storage may comprise computing, at a first time, a first percentage of a total application workload that is performing memory writes for application data units with sizes corresponding to the small memory block. The first portion of the asymmetric memory may be selected as the temporary storage based on computing the first percentage at the first time. The first portion of the asymmetric memory selected as the temporary storage may be proportional to the first percentage.

At a second time that is distinct from the first time, a second percentage of the total application workload may be computed that is performing memory writes for application data units with sizes corresponding to the small memory block. Based on determining that the second percentage is different from the first percentage, a second portion of the asymmetric memory may be selected as the temporary storage at the second time. The second portion of the asymmetric memory may be proportional to the second percentage and may be different from the first portion.

The second portion of the asymmetric memory selected as the temporary storage at the second time may include a portion of the asymmetric memory that was a part of the reconciled storage at the first time. A new portion of the remaining asymmetric memory may be reconfigured as the reconciled storage at the second time, including a portion of the asymmetric memory that was a part of the temporary storage at the first time.

Writing the first application data unit to the temporary storage may comprise writing the first application data unit to the temporary storage sequentially with other application data units stored in the temporary storage.

The threshold may be based on a ratio of an area of the temporary storage storing the application data units and a free area of the temporary storage. Determining whether the threshold is reached for writing the application data units stored in the temporary storage to the reconciled storage may comprise determining whether the ratio is greater than a pre-determined threshold.

The logical write unit may include a translation unit, which is a fixed size at which a logical memory block address is mapped to a physical block number denoting a physical memory location. Determining whether the threshold is reached for writing the application data units stored in the temporary storage to the reconciled storage may comprise determining whether the temporary storage includes application data units that correspond to a complete translation unit. A write operation may be performed on a free area of the reconciled storage that has a size same as a translation unit for writing the application data units stored in the temporary storage that correspond to the complete translation unit.

The temporary storage may include a first redundancy structure for the application data units stored in the temporary storage that may be different from a second redundancy structure used for the application data units written to the reconciled storage. The first redundancy structure may differ from the second redundancy structure in at least one of a replication mechanism used and an amount of redundancy. The replication mechanism used may be data mirroring or parity encoding. The first redundancy structure may include a 1:1 redundancy structure while the second redundancy structure may include one of a 1:4 and a 1:8 redundancy structure.

Performing a memory write operation on the reconciled storage for writing the application data units to the reconciled storage may comprise determining, for a first logical write unit, a first portion with a size corresponding to the small memory block includes invalid data while remaining portions of the first logical write unit include valid data. The logical write unit may be stored partly in the reconciled storage and partly in the temporary storage. An application data unit included in the temporary storage may be identified as valid data corresponding to the first portion of the first logical write unit. Responsive to identifying the application data unit in the temporary storage, the remaining portions of the first logical write unit may be retrieved from the reconciled storage and the temporary storage. The identified application data unit may be merged with the remaining portions of the first logical write unit into a new logical write unit such that an arrangement of data in the new logical write unit may be same as an arrangement of data in the first logical write unit. The data corresponding to the new logical write unit may be written to the reconciled storage and the temporary storage. The identified application data unit may be removed from the temporary storage.

Writing the data corresponding to the new logical write unit to the reconciled storage may comprise writing the data corresponding to the new logical write unit to a free area of the reconciled storage that is different from an area of the reconciled storage that held the first logical write unit.

A read request for data that is stored in the asymmetric memory may be received. A first translation table that includes information on location of the data in the asymmetric memory may be examined. It may be determined that a first portion of the data is stored in the temporary storage and a second portion of the data is stored in the reconciled storage. A second translation table that includes information on location of the first portion in the temporary storage may be examined. The first portion of the data may be retrieved from the temporary storage based on the information included in the first translation table. The second portion of the data may be retrieved from the reconciled storage based on the information included in the first translation table. The first portion and the second portion may be combined to obtain the requested data. A response to the read request may be made with the requested data.

The second translation table may be configured to provide information on location of small memory blocks in the temporary storage. At least one of the first and second translation tables may be stored in dynamic memory that is separate from the asymmetric memory.

In another aspect, a portion of an asymmetric memory is configured as a reconciled storage for application data units with varying sizes, wherein latency of read operations is different from latency of write operations in the asymmetric memory. A second memory is configured as a temporary storage for application data units with sizes corresponding to a small memory block that is smaller than the size of a logical write unit associated with the asymmetric memory. A first application data unit is received for writing to the asymmetric memory. A size of the first application data unit is computed. It is determined that the first application data unit corresponds to a small memory block based on the computed size, wherein a small memory block includes application data units with sizes within a certain size limit. The first application data unit is written to the temporary storage based on determining that the first application data unit corresponds to a small memory block, wherein the temporary storage includes application data units with sizes corresponding to the small memory block.

An amount of data written to the temporary storage is ascertained. The amount of data is compared to a pre-determined threshold for writing the application data units stored in the temporary storage to the reconciled storage. It is determined whether the amount of data has reached the threshold. A memory write operation is performed that writes at least a portion of the application data units stored in the temporary storage to the reconciled storage based on determining that amount of data has reached the threshold. The application data units that are written to the reconciled storage are removed from the temporary storage.

Implementations may include one or more of the following features. The second memory may include an asymmetric memory. The second memory may include a random access memory device distinct from the asymmetric memory.

In another aspect, a first portion of an asymmetric memory is divided into a set of buffers. Each buffer in the set is configured for temporary storage of application data units with sizes corresponding to a small memory block that is smaller than the size of a logical write unit associated with the asymmetric memory, which includes memory devices in which latency of read operations is different from the latency of write operations. With each buffer in the set, context information is associated that is different from the context information corresponding to other buffers in the set.

A portion of the remaining asymmetric memory is configured as a reconciled storage for application data units with varying sizes. A first application data unit is received for writing to the asymmetric memory. The first application data unit is of a size that corresponds to the small memory block. The first application data unit is tagged with context information.

A first buffer is selected from the set of buffers for temporary storage of the first application data unit. Selection of the first buffer is based on a match of the context information associated with the first buffer and the context information associated with the first application data unit. The first application data unit is written to the first buffer.

Implementations may include one or more of the following features. The context information may be based on a process that is distinctly associated with each buffer in the set of buffers, the process configured for managing write operations performed on the corresponding buffer.

The application data units stored in a particular buffer in the set of buffers may correspond to sequential data for a higher level application. Different higher level applications may be associated with different buffers in the set of buffers.

A second application data unit may be received for writing to the asymmetric memory. Based on computing the size of the second application data unit as corresponding to at least the size of the logical write unit, the second application data unit may be written directly to the reconciled storage.

The asymmetric memory may include a flash-based memory system. Dividing a portion of the asymmetric memory into a set of buffers may comprise computing, at a first time, a first percentage of a total application workload that is performing memory writes for application data units with sizes corresponding to the small memory block. The first portion of the asymmetric memory may be selected as the temporary storage based on computing the first percentage at the first time. The first portion of the asymmetric memory that is selected as the temporary storage may be proportional to the first percentage. The selected first portion of the asymmetric memory may be configured into the set of buffers.

At a second time that is distinct from the first time, a second percentage of the total application workload that is performing memory writes for application data units with sizes corresponding to the small memory block may be computed. Based on determining that the second percentage is different from the first percentage, a second portion of the asymmetric memory may be selected as the temporary storage at the second time. The second portion of the asymmetric memory may be proportional to the second percentage and may be different from the first portion.

The second portion of the asymmetric memory selected as the temporary storage at the second time may include a portion of the asymmetric memory that was a part of the reconciled storage at the first time. Reconfiguring a new portion of the remaining asymmetric memory as the reconciled storage at the second time may include a portion of the asymmetric memory that was a part of the temporary storage at the first time.

Writing the first application data unit to the first buffer may comprise writing the first application data unit to the first buffer sequentially with other application data units stored in the first buffer. For the first buffer it may be determined whether a threshold is reached for writing a plurality of application data units stored in the respective buffer to the reconciled storage. The determination may be performed independently for each buffer in the set. Based on determining that the threshold is reached for the first buffer, a memory write operation may be performed on the reconciled storage for writing the application data units included in the first buffer to the reconciled storage. The application data units that are written to the reconciled storage may be removed from the first buffer.

The threshold may be based on a ratio of an area of the first buffer storing the application data units and a free area of the first buffer. Determining whether the threshold is reached for writing the plurality of application data units stored in the first buffer to the reconciled storage may comprise determining whether the ratio is greater than a predetermined threshold.

The logical write unit may include a translation unit. The translation unit may indicate a fixed size at which a logical memory block address is mapped to a physical block number denoting a physical memory location. Determining whether the threshold is reached for writing the plurality of application data units stored in the first buffer to the reconciled storage may comprise determining whether the first buffer includes application data units that correspond to a complete translation unit.

A write operation may be performed on a free area of the reconciled storage that has a size same as a translation unit for writing the application data units stored in the first buffer that correspond to the complete translation unit.

Performing a memory write operation on the reconciled storage for writing the application data units included in the first buffer to the reconciled storage may comprise determining, for a first logical write unit, a first portion with a size corresponding to the small memory block includes invalid data while remaining portions of the first logical write unit include valid data. The logical write unit may be stored partly in the reconciled storage and partly in the temporary storage.

An application data unit included in the first buffer may be identified as valid data corresponding to the first portion of the first logical write unit. Responsive to identifying the application data unit in the first buffer, the remaining portions of the first logical write unit may be retrieved from the reconciled storage and the temporary storage. The identified application data unit may be merged with the remaining portions of the first logical write unit into a new logical write unit such that an arrangement of data in the new logical write unit is same as an arrangement of data in the first logical write unit. The data corresponding to the new logical write unit may be written to the reconciled storage and the temporary storage. The identified application data unit may be removed from the first buffer.

Writing the data corresponding to the new logical write unit to the reconciled storage may comprise writing the data corresponding to the new logical write unit to a free area of the reconciled storage that is different from an area of the reconciled storage that held the first logical write unit.

Each buffer in the set may include a first redundancy structure for the application data units stored in the respective buffer that may be different from a second redundancy structure used for the application data units written to the reconciled storage.

The first redundancy structure may differ from the second redundancy structure in at least one of a replication mechanism used and an amount of redundancy. The replication mechanism used may be data mirroring or parity encoding. The first redundancy structure may include a 1:1 redundancy structure while the second redundancy structure includes one of a 1:4 and a 1:8 redundancy structure.

A read request may be received for data that is stored in the asymmetric memory. A first translation table may be examined that includes information on location of the data in the asymmetric memory. It may be determined that a first portion of the data is stored in the set of buffers and a second portion of the data is stored in the reconciled storage. A second translation table may be examined that includes information on location of the first portion in the set of buffers.

The first portion of the data may be retrieved from the set of buffers based on the information included in the first translation table. The second portion of the data may be retrieved from the reconciled storage based on the information included in the first translation table. The first portion and the second portion may be combined to obtain the requested data. A response to the read request may be made with the requested data.

The second translation table may be configured to provide information on location of small memory blocks in the set of buffers. At least one of the first and second translation tables may be stored in dynamic memory that is separate from the asymmetric memory.

Implementations of the above techniques include one or more methods, computer program products, systems and means. A computer program product is suitably embodied in a non-transitory machine-readable medium and includes instructions executable by one or more processors. The instructions are configured to cause the one or more processors to perform the above described actions.

A system includes a non-transitory machine-readable medium storing instructions that are executable by one or more processors. The instructions, when executed, are configured with modules that cause the processor to perform operations. The modules comprise modules that perform the above described actions.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
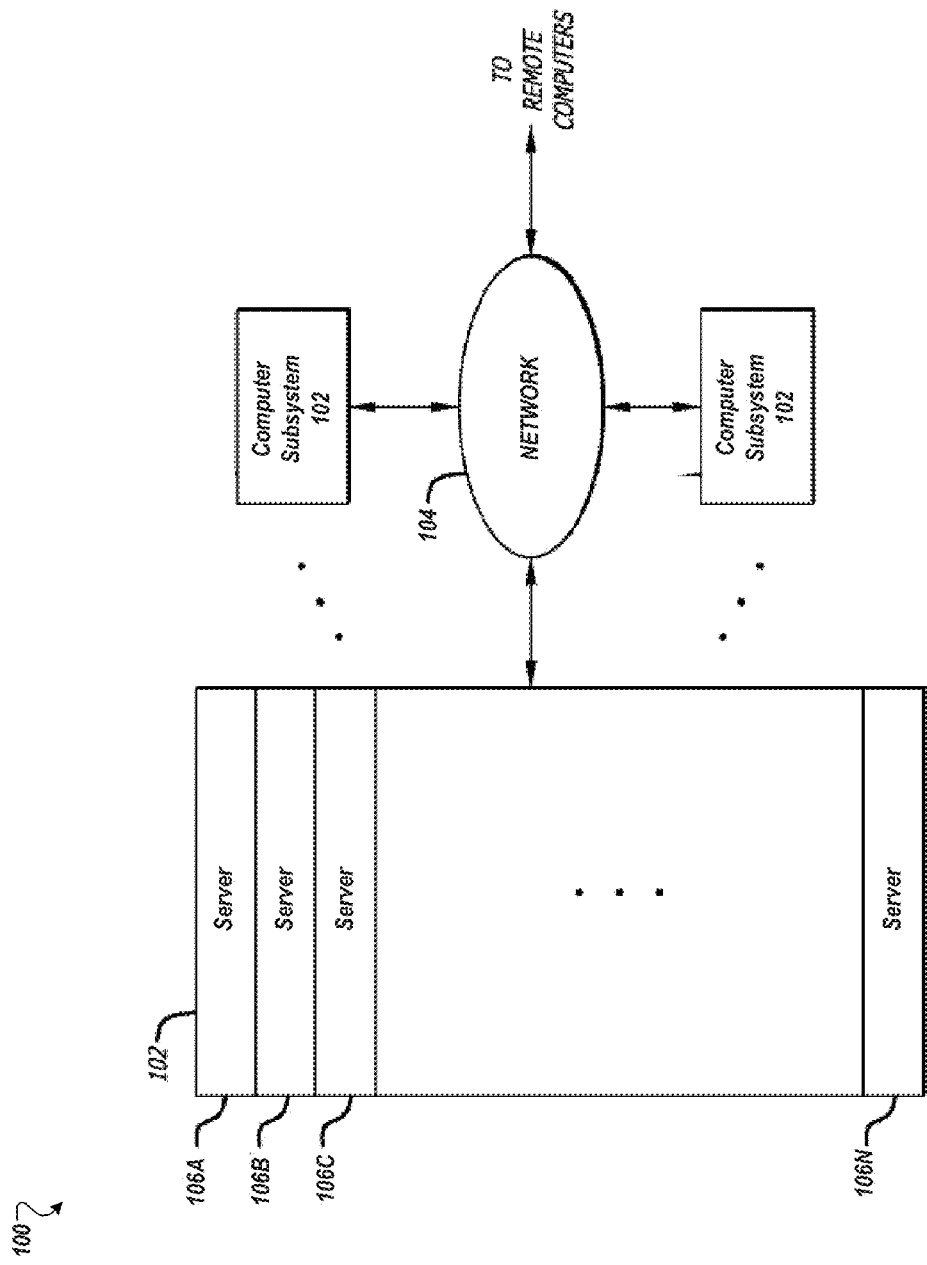
FIG. 1 illustrates an example of a system that uses flash memory for storing data.

Computer systems generally include memory modules that are used in the storage of data and instructions. The memory modules include dynamic random access memory (DRAM) integrated circuits (ICs), which are volatile memory typically used for temporary data storage during processing, and magnetic storage disks for longer term data storage. In some computer systems, in addition or as an alternative to DRAM and magnetic storage disks, non-volatile random access memory (NVRAM) systems are used for data storage. NVRAM may be configured to provide high-performance read access with a granular degree of access that is comparable to DRAM. At the same time, NVRAM may offer large non-volatile storage capacity, which is comparable to magnetic storage disks, while providing high-density storage that utilizes less physical space as compared to magnetic storage disks. In addition, NVRAM may consume less power than DRAM and magnetic storage disks. Realizations of NVRAM in computer systems include flash memory, such as NAND flash and NOR flash memory, and phase change memory, among others.

In some flash memory systems, due to the internal structure and/or organization of the memory device, the granularity at which data is written to the memory device may be larger than the granularity at which write operations are performed by the operating system or applications. In such systems, for very small amounts of data, the granularity of the write operations can lead to inefficiencies with respect to the latency of the operations, or with respect to the amount of wasted space, or both. An efficient mechanism for writing very small amounts of data to the flash memory may be implemented using a log-based storage structure. In such implementations, when a small amount of application data is received by the flash memory system, the data is initially written to a log structure as quickly as possible to satisfy the latency requirements of the application. The log may be in a portion of the physical memory, which is separate from the portions used for storing data and typically dedicated for storing the log. At a later point in time, the data accumulated in the log is written to longer-term storage in the memory in groups of larger sizes such that the wasted space is greatly reduced.

In some implementations, a flash memory device includes one or more memory cards on which flash memory dice, which are integrated circuit memory chips, are affixed. Some computer systems that process data on a large scale, such as enterprise computer systems or server farms, may use large amounts of memory. Such systems may use memory devices hosting multiple memory cards, with a large number of flash memory dice or chips on each card. The computer systems may implement techniques like data striping, data mirroring, and parity encoding (akin to Redundant Array of Independent Disks (RAID)) in order to provide performance improvement and data reliability.

In this context, a memory die may be represented or referenced as a memory chip, and the two terms "die" and "chip" may be used interchangeably. A flash memory device may be represented or referenced as one memory card on which flash memory dice are affixed, and the terms "flash memory device," "flash memory card," "memory device" and "memory card" may be used interchangeably.

In one sense, data striping may refer to a technique of segmenting logically sequential data, such as a file, in a manner such that management and access to sequential logical segments are stored and accessed from locations in different physical storage devices, such as different flash memory dice mounted on a memory card. Each logical segment of data thus created by striping is referred to as a data stripe. Data mirroring is the replication of logical memory volumes onto separate physical memory in real time to ensure continuous availability. A mirrored volume is a complete logical representation of separate volume copies.

In addition, or as an alternative, to data mirroring, a combination of data striping with redundant encoding of data may be used to realize performance and resiliency improvements. The redundant encoding may be referred to as "parity" encoding operations or measures. In one sense, parity may differ from mirroring in that the parity operations store some data, for example, in an additional flash die, which is not a mirrored copy of data that is stored elsewhere. Instead, the parity encoded data represents a special function of the data (for example, an XOR encoding of the data bits) that is to be protected. The property of this special function is that a system may recreate the original data using a subset of the data items and the parity encoded values—the subset that is used is dependent on the function in use. The parity encoded data also may be included in a logical segment that is similar in structure to the data stripes. The logical segment corresponding to the parity encoded data is referred to as a parity stripe. The striped data along with the corresponding parity stripe may be referred to as a RAID group. Therefore, a RAID group be distributed across a group of dice and can help recover from die failures using a subset of the data in the array along with the parity encoded values for the array.

Generally, a memory card is organized into packages that include flash memory dice. The dice are composed of die planes that include erase blocks, which in turn include write pages. A die plane is effectively a way for the flash manufacturers to be able to replicate the same memory area and control circuitry in a parallel fashion within the same flash memory die in order to drive capacities.

The smallest physical section of a flash memory die that may be accessed at a time for performing a memory write operation is known as a write page. Depending on the technology of the memory device, the size of the write page may be 8, 16 or 32 kilobytes (KB) per device. However, for various considerations that include performance, redundancy and reliability, flash memory devices may stripe the application data across multiple flash memory dice when performing write operations. For example, in one striping scheme, the application data may be written to eight flash memory dice. Therefore, effectively the smallest unit that can be written to a flash memory device that includes a group of flash memory dice may be on the order of 8×8 KB, that is, 64 KB, or more.

The smallest write unit into a flash memory device may have an additional multiplicative impact due to the die planes. In some implementations, flash memory devices are configured to perform as many application data writes as possible for a fixed unit of power, since programming flash devices can be power-intensive operations. For example, multi-plane operations tend to be more power-efficient than single plane operations. This may be due to the internal organization of a single-plane or double-plane memory device, and the mechanism of a write operation. During a flash write operation, power is consumed primarily from biasing the memory word line to allow transfer of electrons into the floating gate. The energy consumption is proportional to the product of the voltage differential and the capacitance of the word line. Multi-plane memory structures have smaller word line capacitance compared to single-plane organizations for the same capacity. Therefore, for writing more data, multi-plane devices consume power that is approximately equivalent to the power consumed by single-plane devices. This leads to multi-plane devices being more power-efficient per unit data.

Consequently, an efficient way to write to flash memory dice is to perform multi-plane programming operations. Accordingly, flash memory devices may use 8 KB write pages that are striped 8 wide with double-plane operations, so the minimum granularity of the write unit may be a write page*2*8. Here '2' denotes number of die planes and '8' indicates, for a given width of the data stripe, the number of flash die over which application data is striped. For data stripe width of 8, where a 4K block may be striped across 8 dice with 512 bytes per die, the size of the write unit may be on the order of 128 KB.

In some memory systems that use flash memory cards, when a write operation is received from an application that wants to store 512 byte data, the mechanisms managing the write operation to a memory card, such as the memory controller managing the card and/or the system software driver, may write the 512 bytes of application data to a 128 KB write unit in one memory write operation. In some implementations, the memory controller and/or the software driver reads the 128 KB block that corresponds to the write unit from the flash memory dice, modifies the 512 bytes within the 128 KB block and then writes the block back to the flash dice. Therefore, there may be a large expansion in information that gets written in response to the data sent by the application or the operating system. In addition to the potentially wasted space, to perform one unit of application write, the system processes 128 KB divided by 512 bytes, that is, 256 times the amount of media writes. Therefore, this may lead to undesirable "write amplification," which refers to the additional memory that is processed to write a certain small amount of data.

In some other implementations, the write operation may be performed not at the level of the write unit, but at the granularity of the translation unit. The granularity at which DRAM pages get managed or file system blocks get managed is commonly referred to as a translation unit, which is a logical construct specific to the implementation of the flash translation layer for the flash storage device. The flash translation layer internally maintains a translation table, which maps a logical block address (LBA) to a physical block number (PBN), denoting a physical flash location. The translation table is usually maintained at a fixed block granularity, that is, fixed-size LBAs are mapped to fixed-size PBNs. This fixed granularity of translation is referred to as the translation unit. The overall system may be made more efficient by selecting the translation unit to be the same size as the expected data access size from applications or the operating system.

At the level of applications and operating systems that store data in flash memory devices, the natural block size of data access falls into several categories, with one common size being 4 KB. Therefore, in some implementations, the translation unit is configured to be 4 KB in size.

In such implementations, the memory controller and/or the software driver may maintain translations at 4 KB sizes between the logical view of the storage and the physical locations in the flash dice to which the logical view of storage is mapped. A logical address may map to different physical addresses at different points in time, and this property may be used to improve the efficiency with which to do smaller writes. The 512 byte application data is part of a logical 4 KB block; the 256 times write amplification of the earlier scheme may be avoided by considering the logical 4 KB block that includes the 512 byte associated with the application data. The memory controller/software driver looks at the logical 4 KB block and determines what the current location of the logical 4 KB block is in the physical flash space, which may be some 4 KB physical block in a flash die. The memory controller/software driver retrieves the information of the entire 4 KB block from the flash die, updates the changed 512 byte portion in the 4 KB block, writes the block to a new location in the flash memory dice and adjusts the mapping so that the 4 KB logical block now refers to a different 4 KB physical block on the flash dice.

In some implementations, the updated 4 KB block may be managed by the flash memory device by writing the write request data to a buffer, such as a Static RAM (SRAM) buffer coupled to the memory device, and updating the translation table to reflect the correspondence between the logical block address of the request and the physical flash location where the data will be stored. When the SRAM buffer gets filled up with translation units, it can be written out as a write unit to the flash memory dice on the device. The SRAM may be protected through some hardware mechanism such that, the memory system can guarantee that the application data will be persisted in the flash device in the case of power failure. From the viewpoint of the application or the operating system, the write amplification is an 8-way expansion, since, the system rewrites 4 KB of stored data to absorb the 512 byte write. Such 8× write amplification may be a considerable improvement over the 256× write amplification described previously.

However, for some applications, the 8-way expansion may be unacceptable. One reason for this is because the flash memory dice may wear out eight times faster than otherwise would have been the case.

Secondly, there are application access patterns called "log writes" that are smaller than the size of the translation unit. This may be the case, for example, for database applications. Depending on the database of interest, the application access may be as small as 512 bytes, or sometimes up to 1 KB, but significantly smaller than 4 KB. In addition, there are some classes of applications that perform memory accesses for very small amounts of data, for example, 256 bytes or 512 bytes. Examples of such applications include high-frequency trading used by financial organizations, and graph search, which is used by social-networking sites when users try to do iterative graph updates. Application data of such small sizes may be referred to as small blocks or ultra-small blocks of data.

Given the size difference between the write unit or translation unit described previously, and the small or ultra-small blocks, there may be a mismatch between the size of data that an application wants to write to memory, and the regular memory write operation for a flash memory device. Most of the application and operating system context in which such small or ultra-small block write operations are performed tend to be extremely latency sensitive with higher expectations of performance. Such applications or operating system jobs may not tolerate the overhead of reading and retrieving 4 KB blocks on flash, making the modification and then writing the block back to the physical memory. For example, in an 8-way expansion, the latency for a 512 byte operation may be in the range of 250 to 300 microseconds. However, the application or the operating system may expect that the 512 byte write can be performed at 1/10th the cost of that, such as in 25 microseconds or lower.

Accordingly, some of the standard ways of performing write operations for small or ultra-small blocks of data either result in many more media writes on the flash memory dice than is needed, or may introduce higher latency than that acceptable to the applications, or both. It may be useful to implement mechanisms that perform write operations to flash memory dice for small or ultra-small blocks of data, without incurring write amplification or unacceptable latency.

In some implementations, a mechanism for writing small and ultra-small blocks of data to flash memory dice efficiently, with low write amplification and with low latency, may be achieved using a log-based storage structure. In such implementations, when a small or ultra-small block of application data is received by a flash memory device, the data is written to a log on the initial write, which is intended to take place as quickly as possible to satisfy the latency requirements of the application. The log may be maintained in a portion of the flash memory dice managed by the flash memory device and has the same persistence properties as other data in the device. At some later point in time, the log is collapsed into persistent flash storage in a manner that the data in the log is written in the form of a translation unit. The log is collapsed by merging or reconciling the data for the write operations. Collapsing the log ensures that the entire physical space on the flash memory dice is not filled up in the log form, but instead uses a more efficient encoding of the data.

Both the log-based storage structure and the persistent flash storage may be implemented in the flash memory hardware. For example, the flash memory device may perform a logical partitioning of the capacity of the flash memory device—the capacity of the device that is devoted to the log region may vary with time, that is, map to different flash memory die and involve different amounts of physical space per die at different points in time.

Depending on the configuration, at some points in time some flash memory die may be dedicated entirely to storing data, with no portion configured for the log. The system may update the portions of the flash memory device that are allocated to the data storage and the log dynamically at runtime based on different metrics, such as the application load or the throughput of the write operations to the reconciled storage.

Methods, systems and devices are described in the following sections for performing write operations of small and ultra-small blocks of data to flash memory devices using a log-based structure. For the purposes of this discussion, the terms flash memory die, flash memory chip and flash memory are used synonymously. The term 'small block' is used to refer to both small blocks of application data and ultra-small blocks of application data, where the size of a small or an ultra-small block of data is understood to be less than the size of a translation unit. In addition, though the remaining sections are described in reference to flash memory devices, the techniques described here may be equally applicable to other forms of memory devices with aspects of asymmetric behavior. For example, phase change memory devices may be configured to employ these operations.

FIG. 1 illustrates an example of a system 100 that uses flash memory for storing data. The system 100 may implement techniques for performing write operations of small blocks of data to a flash memory device using a log-based structure.

The system 100 includes one or more computer subsystems 102 that are interconnected by a network 104. A computer subsystem 102 includes one or more servers such as 106A, 106B and 106C through 106N.

Each computer subsystem 102 may be a server rack that hosts an array of servers, such as 106A, 106B, 106C and 106N. This may be the case, for example, when the system 100 is a server farm or a back end processing center for an enterprise. The computer subsystems may be co-located at one physical location, such as in a data center, or they may be geographically distributed.

The computer subsystems 102 communicate with each other and with remote computers via the network 104, which may include a circuit-switched data network, a packet-switched data network, or any other network able to carry data, such as Internet Protocol (IP)-based or asynchronous transfer mode (ATM)-based networks, including wired or wireless networks. The network 104 may be a Local Area Network (LAN) or a Wide Area Network (WAN). The network 104 may include the Internet, analog or digital wired and wireless networks (such as IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet and/or any other delivery or tunneling mechanism for carrying data, or any appropriate combination of such networks. In addition, the network 104 may be configured to handle secure traffic such as secure hypertext transfer protocol traffic (HTTPS) or virtual private networks (VPN) such that the connections between the computer subsystems 102 may be secure connections, such as using VPN or HTTPS. However, in other implementations, the connections may be unsecured connections.

Each server 106A, 106B, 106C or 106N is a computing device that includes memory modules for storing data, such as hard drives and flash memory. The flash memory may be in the form of memory cards on which multiple flash memory chips are affixed. A flash memory card may be organized into multiple memory packages or die packages, also referred simply as packages. A package is a multi-chip module that includes flash memory dice. Each flash memory die may be composed of flash planes that include constituent blocks of memory cells where data are stored. In some implementations, a die with two planes has two distinct sub-regions, each sub-region with its own memory array and interface circuitry. The die has a demultiplexing structure that sends commands to one plane or the other (or in some cases, to both planes). The memory cells may be single-level cells (SLCs), which store a binary digit (bit) corresponding to the value of the data that is stored in the particular memory cell. Alternatively, a memory cell may be a multi-level cell (MLC), which are configured to store several bits corresponding to the value of the data stored in the logical write page locations associated with the particular memory cell.

Each server may include multiple instances (for example, up to 16 to 24) of such flash memory cards that are connected to a motherboard in the server, yielding total flash memory capacity that may vary in range from 0.5 terabytes (TB) for a smaller memory card or system to around 100 TB capacity for a larger memory card. From the perspective of a flash memory card, the server in which the memory card is included may be considered as the host system for the memory card. Therefore, based on the above exemplary figures, the total capacity of the host system may range from 0.5 TB to 100 TB, multiplied by the number of cards in the system.

As mentioned previously, flash memory is a form of NVRAM, which is a type of random-access memory that retains its information when power is turned off (hence, nonvolatile). This is in contrast to DRAM and static random-access memory (SRAM), which both maintain data only for as long as power is applied. NVRAM has asymmetric properties, in which the constituent operations, such as memory reads, writes, or erases, differ from each other by one or more orders of magnitude. For example, memory reads are performed within the same order of magnitude as the operations are performed in DRAM, memory write operations are performed much slower in comparison, and erase operations have even bigger limitations. Furthermore, certain types of NVRAM modules may have a limited number of writes. This may be the case, for example, due to the physical characteristics present in some types of NVRAM information storage mechanisms, which allow each NVRAM physical cell to be programmed and/or erased a limited number of times. Different types of NVRAM may have different analog properties (the underlying "noisy media" characteristics) depending on the underlying physical mechanism and density of the memory cell.

Each server also includes processors for processing data stored in the memory modules. In some implementations, the processors are present in the host system, for example, in the motherboard in the server to which the memory cards are coupled. In such implementations, the management of the flash memory may be performed by the host system. In some other implementations, one or more processors may be embedded in the flash memory cards. In such implementations, the management of the flash memory may be performed by the processors embedded in the memory card itself, or by some suitable combination of the processors embedded in the memory card and the processors in the host system.

The processors may be configured to execute instructions that are stored in the flash memory or elsewhere, such as in read-only memory (ROM). The instructions may include instructions for processing the data, for performing data striping at the granularity of sub-sections of flash memory chips, for recovering data stripes with degraded memory sections by dynamically re-striping the sections of flash memory chips that include degraded regions.

Each server also may include DRAM for temporary storage of data during processing operations. In addition, each server includes network interfaces for communicating with other servers on the same computer subsystem 102 or in other computer subsystems or remote computers.

Figure 2A:
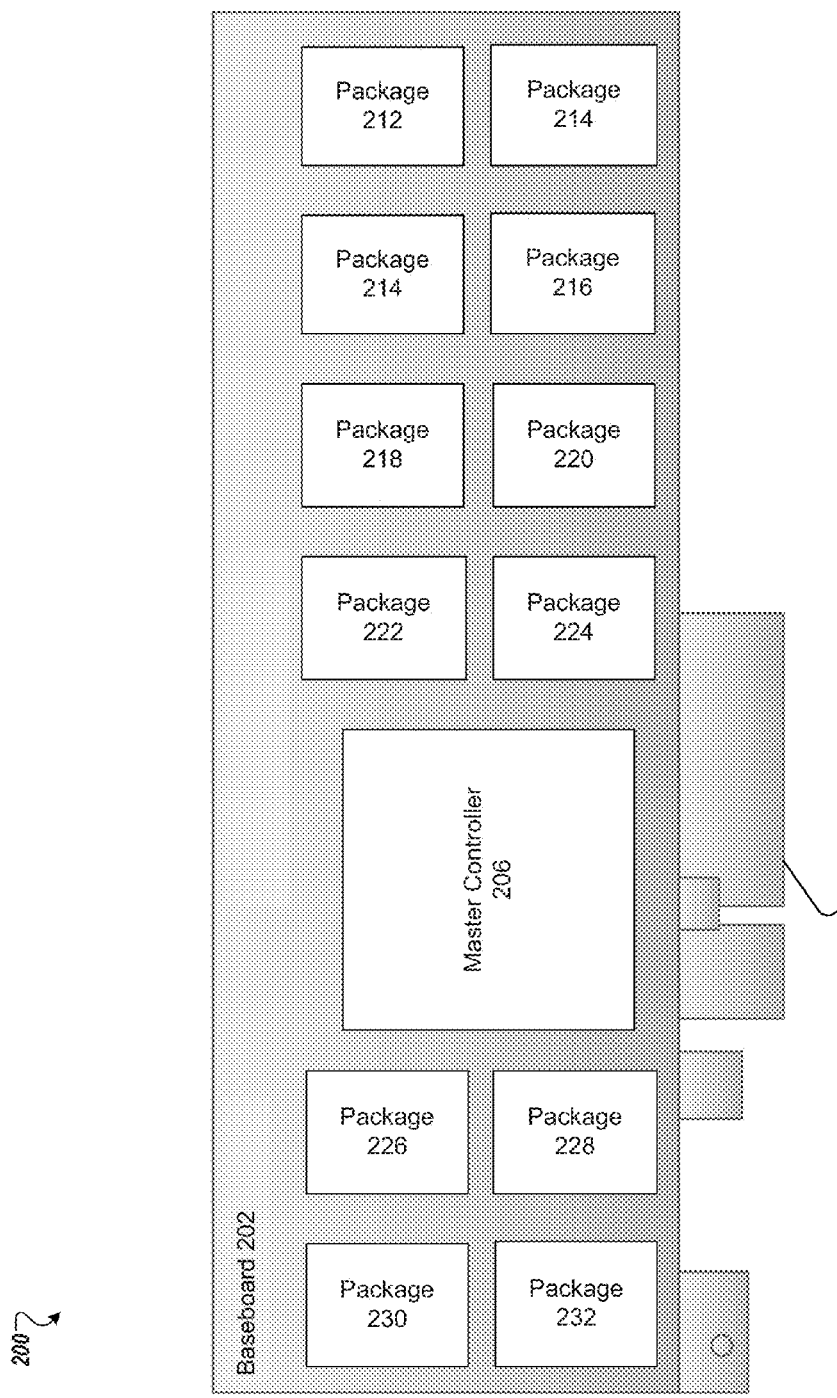
FIGS. 2A-2B illustrate an example of a memory device that includes flash memory dice.
Figure 2B:
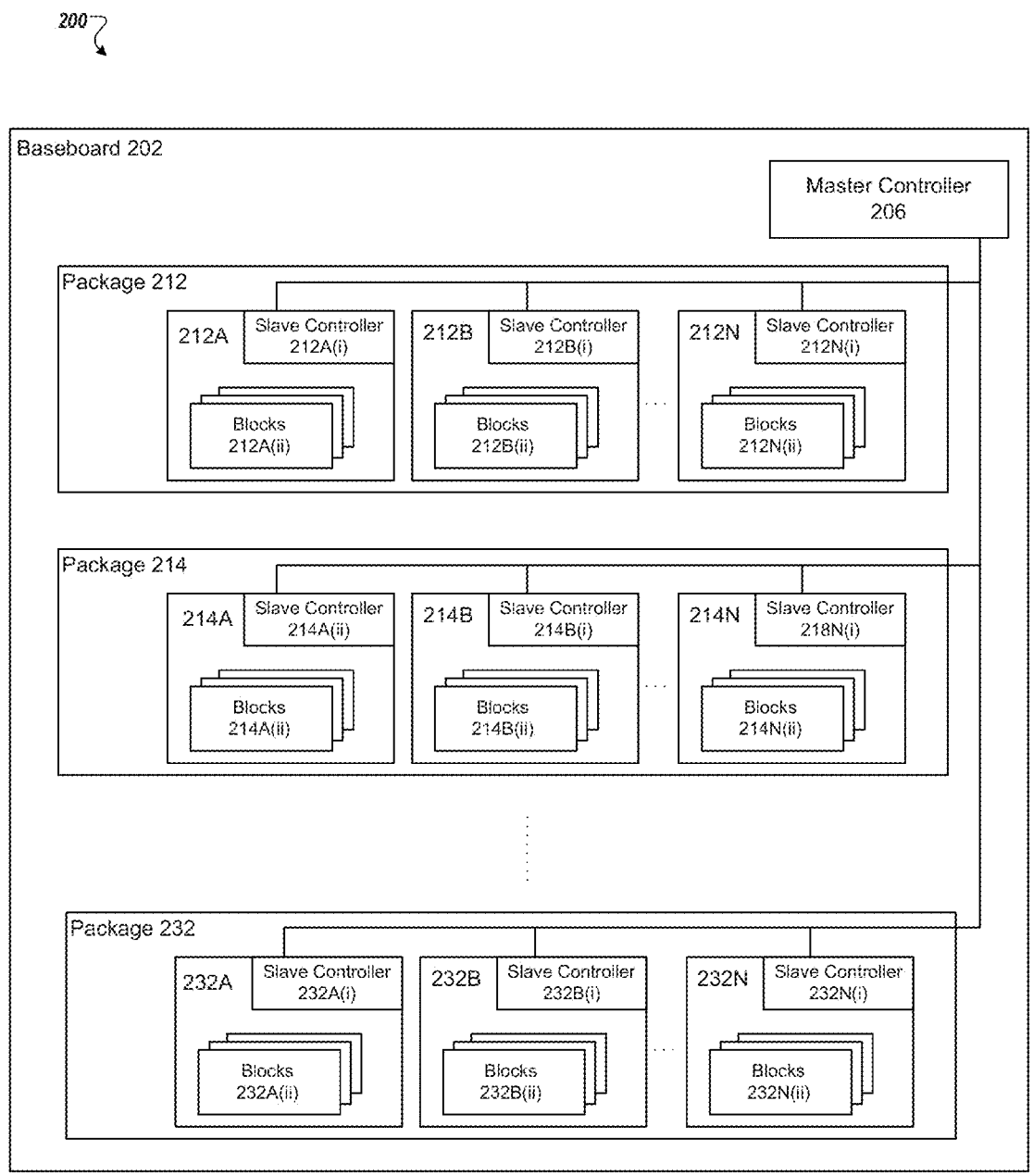

FIGS. 2A-2B illustrate an example of a memory device 200 that includes flash memory dice. The memory device 200 may be included, for example, in a server in the system 100, such as one of servers 106A, 106B, 106C and 106N. However, the memory device 200 also may be included in other systems.

FIG. 2A shows a schematic of the memory device 200 viewed from one side. As shown, the memory device 200, which is a memory card, includes a baseboard 202 with a host edge connector 204. A master controller 206 is mounted on the baseboard 202. Also mounted on the baseboard 202 are one or more memory packages, such as packages 212-232.

The baseboard 202 is a printed circuit board (PCB) that includes one or more layers of printed circuit board traces for interconnecting the various components of the memory card 200, including the master controller 206 and the different packages 212-232. The baseboard 202 may be of a form factor that allows the memory card 200 to be included within the chassis of a server, such as 106A, 106B, 106C or 106N. In some implementations, the baseboard 202 may be configured to support a daughter board, which may be used to expand the memory capacity of the memory card 200. For example, the baseboard 202 may include sockets to which a daughter board may be coupled. The daughter board may include a number of memory packages that are similar to the packages 212-232, thereby increasing the total memory capacity of the memory card 200.

The host edge connector 204 is adapted to couple to sockets mounted to a motherboard of the host system. For example, the connector 204 may couple the memory card 200 to the motherboard included in any of the servers 106A, 106B, 106C or 106N. The connector 204 is a computer data bus connector that is configured for transferring data between the memory card 200 and the host system. For example, the connector 204 may be a Peripheral Component Interconnect (PCI) bus, a PCI-eXtended (PCI-X) bus, a PCI Express (PCIe) computer expansion bus, or some other suitable connector.

The master controller 206 is a processing device that is configured for managing the storage and retrieval of data in the flash memory chips included in the memory card 200. In some implementations, the memory card 200 includes multiple master controllers 206. In some implementations, the master controller 206 manages one or more slave controllers that are included in the packages 212-232 and coupled to the master controller 206 by a plurality of master-slave memory bus channels. In some other implementations, the slave controllers are included in the same logical unit (such as a package) as the master controller, while retaining the logical differences between the master and slave controllers. In yet other implementations, the master controller 206 manages one or more slave controllers that are external to the packages 212-232. For example, the slave controllers may be placed between the master controller(s) and the flash memory dice. The master controller(s) communicate with the slave controllers through master-slave memory bus channels. Each slave controller in turn communicates with a subset of the flash memory dice, using, for example, a separate channel controller to control each die.

A host bus channel formed of traces of the baseboard 202 may couple the master controller 206 to the host edge connector 204 for communicating with the host system. The one or more slave controllers are adapted to provide transparent access to the flash memory included in the packages. The master controller 206 and the slave controllers provide native access of the flash memory to the processors in the host system.

Each of the packages 212-232 includes a rectangular printed circuit board on which is mounted a plurality of packaged flash memory chips. The flash memory chips may include NAND flash memory die, NOR flash memory die, or any other suitable non-volatile memory. In some implementations, each of the packages 212-232 may have different types of flash memory that can be identified to the memory card 200 so that read operations, write operations, and/or erase or maintenance operations can be tailored to the given type of memory.

In some implementations, each package includes 8 NAND flash memory dice, which are arranged in 4 pairings based on electrical wiring and pin outs that come out of the package, among other parameters. The two dice in a pair may be referred to as siblings of each other. The package is configured such that for each pair, one of the dice may be active for performing input/output (I/O) operations at a time, even though both dice may be considered active from a flash operation point of view. Therefore, in a package, 4 of the dice may perform input/output (I/O) operations concurrently, but all 8 dice may be active for performing flash operations.

In the above implementations, in addition to the 12 packages 212-232 that are shown, the memory card 200 includes 12 more packages mounted on the reverse side of the baseboard 202, yielding a total of 24 packages mounted on the baseboard 202. In addition, the memory card 200 includes the daughter board, with 24 packages mounted on the daughter board. Therefore, in such implementations, the total number of packages in the memory card 200 is 48. For 8 dice per package, the above configuration yields a total of 384 flash memory dice in the memory card 200.

In alternative implementations, the number of packages 212-232 may be other than 12, for example, some tens of packages, and the memory card 200 may include additional tens of packages mounted on the reverse side of the baseboard 202, yielding a total number of packages per board that is a number other than 24. With multiple boards per card, such as one or more daughter boards, the total number of packages in the memory card may be in the tens or hundreds, leading to multiple hundreds or thousands of dice.

In addition to the features shown in FIG. 2A, the memory card 200 may include one or more embedded processors, ROM, DRAM and additional NVRAM that are mounted to the baseboard 202. The ROM may be configured to store boot instructions for the memory card 200. The DRAM may be configured to provide scratch pad memory to the embedded processors and store translation structures (for example, a translation table mapping logical addresses to physical addresses) to access data in the flash memory chips. The NVRAM may include firmware instructions for the memory card 200 that may be periodically upgraded. The firmware instructions drive and control the master controller 206 and the and slave memory controllers to perform read, write, erase or maintenance operations to access data with the flash memory chips of the packages 212-232. The embedded processors execute the firmware instructions to drive and control the master and slave memory controllers to access data as well as read, write, and maintain the translation structures in the DRAM.

The embedded processors may be further coupled to the master memory controller 206 and the edge connector 204 to communicate with each. The embedded processors also may be in communication with the host processors in the host system over the edge connector 204 to receive read and write operation requests from the host application or host operating system software to access data in the flash memory dice in the memory card 200.

As described previously, each memory card 200 may have two types of logical controllers, namely, the master controller, which handles host-level interactions, and slave controller(s), which handles flash-level interactions. The master controller and the slave controller(s) may communicate using standard protocols, or a proprietary hardware interface, or any suitable combination of both. In some implementations, this interface is implemented using pins on the physical devices and traces on the baseboard. In other implementations in which master controller and slave controller(s) are in the same physical device, the interface may be implemented using internal device logic on the physical device.

In some implementations, a memory card 200 may utilize two physical devices—each of which implements one master controller and several slave controllers. One of the master controllers may be on the "baseboard" on the PCI expansion slot on the mother board of the computing device, and the other master controller may be on the "daughter board" located on an expansion slot on the baseboard. Communication between the host and the daughter board's master controller may be routed through the baseboard's master controller. In such implementations, communication between the two master controllers may be through the standard interface of PCIe. A proprietary hardware interface also may be feasible.

The master controller(s) and slave controller(s) coordinate their respective actions to implement the data path of the flash memory system. In this context, the data path, which also may be referred to as the data plane, indicates that that the master and slave controllers do not themselves determine which flash memory locations are involved in the memory operations. Instead, the determination is made by the control path or control plane of the system. The master and slave controllers receive commands from the "control path" to perform flash-level operations and carry out such operations against specified host DRAM resources.

The control path of the system may be implemented by the driver software, which may be implemented as firmware instructions executed by the host processor or embedded processors associated with the controllers. In some implementations, there may be a single driver per card, while in other implementations, there may be several drivers per memory card. The driver software instructions may enable each slave controller to communicate independently with the master controller(s).

In some implementations, the driver software runs on the host computing device as a device driver. The device driver communicates with the master controller(s) on the memory card using standard PCIe commands—in standard terminology, the latter may be referred to as "memory mapped I/O" (MMIO) instructions (they are load/store instructions at the processor level, except that they get routed to the appropriate device instead of DRAM). The driver in turn receives requests from host central processing unit (CPU) applications and operating system (for example, the file system component) using standard host-based application programming interfaces (APIs) and mechanisms (for example, a system call).

In some other implementations, the driver software runs on an embedded processor coupled with the baseboard master controller. In these implementations, the term "firmware" is usually used to denote the driver software. In still other implementations, the driver functionality may run in a split/parallel fashion across more than one embedded processor associated with one or more master controllers. In cases where the firmware runs on one or more embedded processors, the applications/operating system requests get communicated to the firmware using the same PCIe memory mapped I/O instructions, using an intermediate (separate, minimal) software driver, for example, installed on the host computing device.

FIG. 2B illustrates a schematic of the memory card 200 showing the flash memory dice included in the packages 212, 214 and 232, which are a subset of the packages 212-232. Package 212 includes flash memory dice 212A . . . 212N, package 214 includes flash memory dice 214A . . . 214N and package 232 includes flash memory dice 232A . . . 232N. Each of the dice 212A . . . 212N includes a slave controller, such as 212A(i)-212N(i) and memory blocks 212A(ii)-212N(ii) respectively. Each of the dice 214A . . . 214N includes a slave controller, such as 214A(i)-214N(i) respectively, along with memory blocks 214A(ii)-214N(ii) respectively. Similarly, each of the dice 232A . . . 232N includes a slave controller 232A(i)-232N(i) respectively and memory blocks 232A(ii)-232N(ii) respectively.

Although FIG. 2B shows the slave controllers 212A(i)-212N(i), 214A(i)-214N(i) and 232A(i)-232N(i) are mounted to the packages 212-232 and coupled between the master controller 206 and the plurality of flash memory dice, in some other implementations, the slave controllers 212A(i)-212N(i), 214A(i)-214N(i) and 232A(i)-232N(i) are mounted to the baseboard 202 and coupled between the master controller 206 and the respective flash memory dice in the packages 212-232. In yet other implementations, the slave controllers 212A(i)-212N(i), 214A(i)-214N(i) and 232A(i)-232N(i) are mounted together in an integrated circuit package with the master controller 206 and coupled between the master controller 206 and the respective flash memory dice in the packages 212-232.

Each slave controller is configured for providing transparent access to its respective die. As described previously, all the slave controllers are connected to the master controller 206 by a plurality of master-slave memory bus channels, which may be implemented as PCB traces on the baseboard 202. The master controller 206 natively controls the flash memory dice to obtain predictable bandwidth and latency performance with the flash memory dice included in the packages 212-232. All operations that take place on the flash memory dice 212A . . . 212N, 214A . . . 214N or 232A . . . 232N (for example, read, write, erase, control operations such as reset, etc.) are completely visible to (and under the control of) the master controller 206. The flash memory interface of active dice of the dice in a package is passed through the respective slave memory controller to the master controller 206. For example, the flash memory interface of the die 212A is passed through the slave controller 212A(i) to the master controller 206.

The master controller 206 is able to exercise directly each of the operations that are supported by the flash memory dice 212A . . . 212N, 214A . . . 214N or 232A . . . 232N. The slave controllers may perform protocol conversion, but do not drop/intercept (without involving the associated flash memory die) a request from the master controller. However, the slave controllers do not autonomously initiate any flash memory operation.

Each slave controller 212A(i)-212N(i), 214A(i)-214N(i) and 232A(i)-232N(i) is configured to arbitrate memory bus channels shared by the multiple flash memory dice 212A . . . 212N, 214A . . . 214N and 232A . . . 232N respectively. Each slave controller can buffer and multiplex signals between the master controller 206 and the multiple flash memory dice. In addition, each slave controller can combine a sequence of predictable non-volatile memory operations together into a compound operation to improve control bandwidth with the flash memory dice.

In some implementations, the data in the flash memory dice 212A . . . 212N, 214A . . . 214N and 232A . . . 232N may be accessed in units of memory that are termed memory blocks or memory pages. For example, the flash memory die 212A includes multiple memory blocks that are indicated collectively by 212A(ii) in FIG. 2B. The size of a memory block may vary based on the type of flash memory that is used. For example, the size of a memory block may be different for NAND flash dice and NOR flash dice. Among NAND flash devices, the sizes may be different SLC and MLC types of NAND flash. NAND flash from different process generations also may have different sizes (for example, 34 nm NAND flash versus 25 nm NAND flash). In addition, the size of a memory block may vary based on the type of operation that is performed on the flash memory device. For example, for a NAND flash memory device, data may be written to the memory device in units of write pages. The size of a write page may be small, in the order of a small number of kilobytes (e.g., in the range 4 KB-16 KB). However, data may be erased from the NAND flash device in units of erase blocks, which are typically larger in size than the write pages (in the order of several megabytes) and one erase block may include multiple write pages. Once data is written to a write page, the entire erase block associated with the write page has to be erased before new data can be written to the write page. Multiple erase blocks in a flash memory die, such as 212A, may be grouped together into a flash plane. The flash memory die may be composed of multiple such flash planes.

In some implementations, regions of one or more flash memory dice in the memory card 200 may be defective. For example, some storage cells in a flash memory die may wear out due to normal wear and tear during operation of the memory card 200. In some memory systems, when a portion of a flash memory die wears out, the entire flash memory die may be replaced by another die in which the data of the failed die is replicated or into which the original data can be restored using replication along with parity reconstruction across the associated RAID group. For example, the flash memory die 212B may replicate all the data chunks that are stored in the flash memory die 212A. When one or more blocks 212A(ii) are in a degraded state, the flash memory die 212A may be replaced by the flash memory die 212B. However, as indicated previously, replacing an entire die when only a portion of the die may be in a degraded state can have an adverse impact on the performance of the memory card 200, and consequently, on the performance of the overall system. In some implementations, once the memory card 200 is deployed in a host system, faulty die cannot be replaced. Therefore, mechanisms may be implemented such that the card will continue to operate over its lifetime even when multiple flash memory dice on the card go bad.

Figure 3:
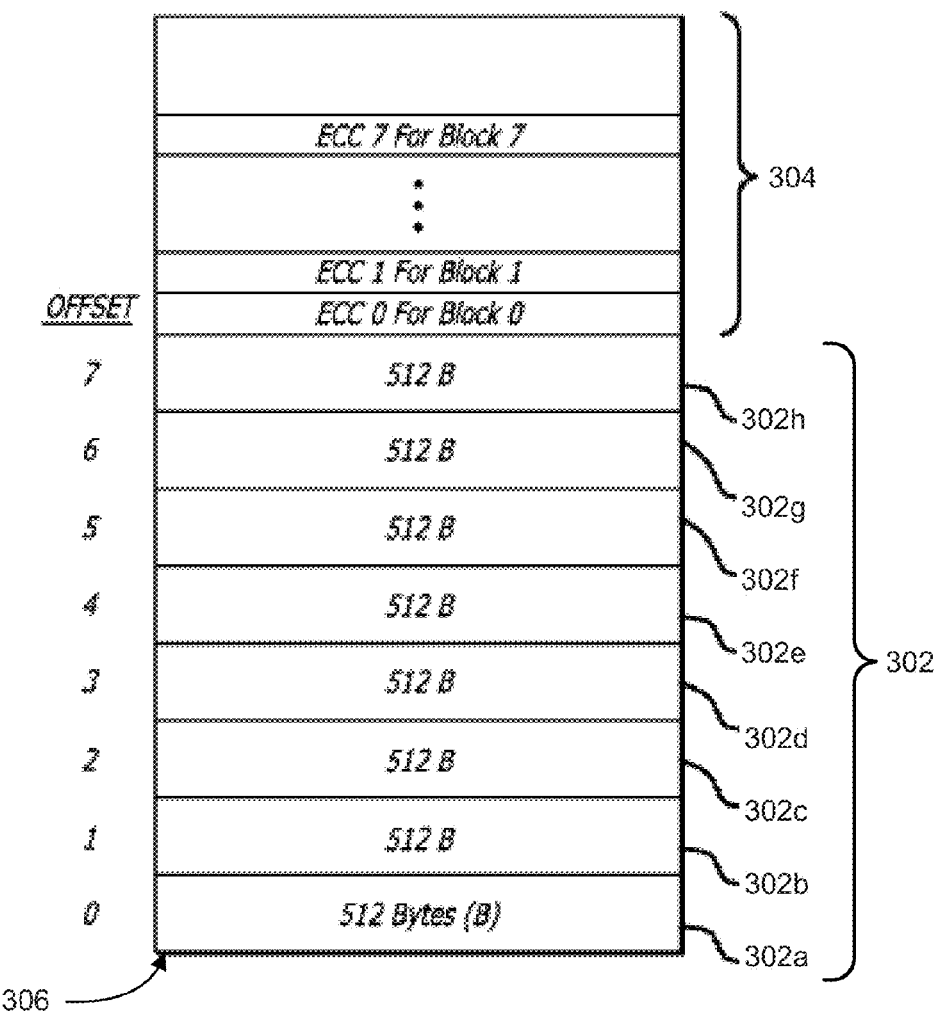
FIG. 3 illustrates an example of a memory page that is stored in a flash memory die.

FIG. 3 illustrates an example of a memory page 300 that is stored in a flash memory die. The flash memory chip may be one of 212A . . . 212N, 214A . . . 214N and 232A . . . 232N that are packaged in the memory card 200. However, the flash memory chip also may be implemented in other memory cards or systems.

The memory page 300 includes a data portion 302 and an error correction code (ECC) portion 304. The data portion 302 includes memory units 302a-302h in which data is stored. The memory page has a page starting address indicated by 306.

The size of the data portion may vary depending on the particular NVRAM design and configuration. In the example shown, the data portion 302 has a size of 4 kilo-bytes (KB). Other sizes for the data portion may be used (for example, 8 KB or 16 KB).

As shown in FIG. 3, the memory page 300 has an offset address indicated by zero through seven from the page starting address 306, which allows each of the memory units 302a-302h to be 512 bytes in size. In some implementations, each of the memory units 302a-302h may correspond to a write page, while the data portion 302 may correspond to an erase block. Therefore, in such implementations, the erase block 302 includes the write pages 302a-302h.

The size of the ECC varies with the underlying NVRAM implementation. For the configuration where the data portion 302 is 4 KB, the ECC portion 304 is 128 bytes. In other implementations, the size of the ECC portion may be higher (such as in the range of 500 bytes) to meet the higher media error rates of data portions of larger size (for example, for more current generations of flash devices such as MLC type memory).

The ECC portion 304 is used to store ECC data that is used for error correction of data stored in 302a-302h. An error correction code may be generated for each 512 byte unit 302a-302h. Program write errors or flash read errors may be detected using the error correction code. While ECC is useful to correct an a priori anticipated threshold of bit errors, redundant data storage may be used to recover data when the number of bit errors exceeds the a priori threshold or due to a complete failure of a storage device, such as the flash memory die in which the memory page 300 is included.

In some implementations, data may be stored in one or more 512 byte regions across a memory page with one or more consecutive offset addresses respectively. The region in which data is stored may be referred to as a chunk of memory. For example, employing a single offset address allows a 512 byte chunk of data to be stored across one of the units 302a-302h of the memory page 300. A RAID group in this case may be consistently written with regions of 512 byte chunks of data. This may be the case, for example, with 7 data stripes and 1 parity stripe spread across 8 flash memory dice that implement 4 KB memory pages, such as the page 300. In this configuration, each die sees a 512 byte region for each stripe within the same memory page.

In some other implementations, a pair of offset addresses (for example, offset addresses 6 and 7) may be used to allow 1 KB chunks of data to be stored in regions of the memory page 300. A RAID group in this case may be consistently written with regions of 1 KB chunks of data. This may be the case with three data stripes and one parity stripe spread across four flash memory devices with 4 KB memory pages, such as the memory page 300. In this configuration, each die sees a 1 KB region for each stripe within the same memory page.

In some implementations, a software driver or embedded firmware operating on the host system may accumulate data, calculate parity, and store the data and parity information as stripes across the flash memory dice. The parity calculations may be performed by the host processors, for example, based on instructions of the host software driver or embedded firmware. In other implementations, the software driver operating on the memory card 200 may accumulate the data and initiate a command to the master controller 206. The master controller 206 can then be responsible for computing the parity information and storing the data and parity stripes across the flash memory dice.

The memory card 200 may include several such RAID groups. For example, referring to the implementation of the memory card 200 with 48 packages with 8 dice per package, the memory card 200 may include 24 RAID groups, with 16 dice in 2 packages in each group.

Figure 4:
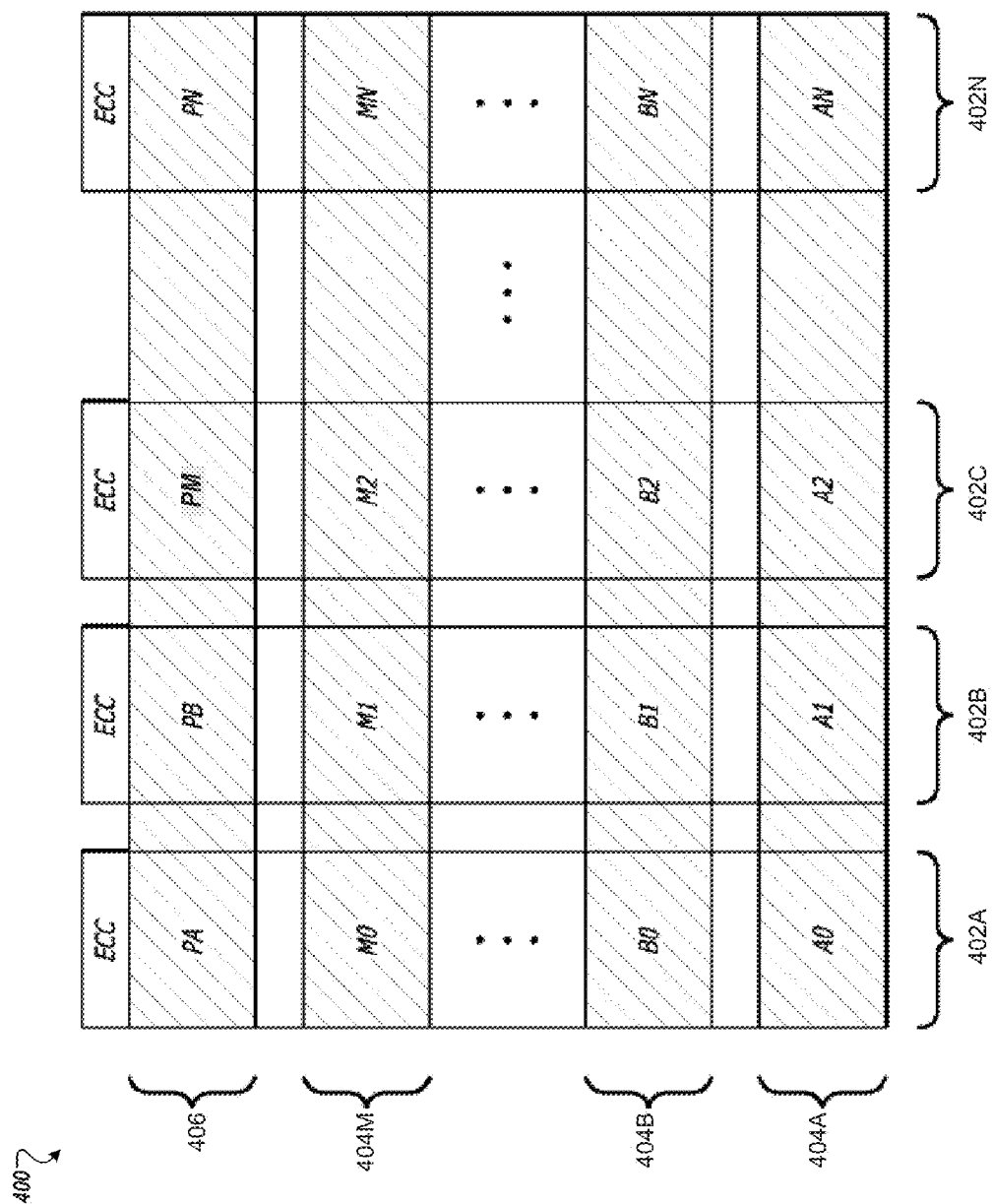
FIG. 4 illustrates an example of a group of flash memory dice storing data redundantly in data stripes distributed across the group of flash memory dice.

FIG. 4 illustrates an example of a group 400 of flash memory dice storing data redundantly in data stripes distributed across the group of flash memory dice. The flash memory dice may be mounted on the memory card 200. For example, the flash memory dice may be 212A . . . 212N, 214A . . . 214N and 232A . . . 232N that are packaged in the memory card 200. Accordingly, the following sections describe the group 400 of flash memory dice as implemented by the card 200 in the system 100. However, the group 400 of flash memory dice also may be implemented by other memory cards and systems.

The group 400 illustrates one implementation of a flash-aware RAID data layout. The group 400 includes N flash memory dice 402A, 402B, and 402C through 402N, collectively referred as 402A . . . 402N. Pages of data are stored across the flash memory dice 402A . . . 402N in M data stripes 404A and 404B through 404M, collectively referred to as 404A . . . 404M. Each stripe includes N data chunks, such as A0 . . . AN for data stripe 404A, B0 . . . BN for data stripe 404B and M0 . . . MN for data stripe 404M. A parity stripe 406 is also stored across the flash memory dice 402A . . . 402N. The parity stripe is formed of parity chunks PA-PM and a single meta-data parity chunk PN. It is to be noted that various configurations may be used other than the configuration shown. For example, different encoding of the parity stripe may be used that group the parity information across multiple data stripes. Similarly, the parity information may be stored as part of the individual data stripes instead of being stored in a separate parity-only stripe.

The flash memory dice 402A . . . 402N may be same as the flash memory dice 212A . . . 212N, or 214A . . . 214N, or 232A . . . 232N. The size of each data chunk may depend on the number of flash memory dice that are used, and the number of data stripes. Each data chunk may have a size same as a write page, or an erase block, or some other suitable size unit of memory. For each data stripe, a corresponding parity chunk is generated by computing parity of the data chunks included in the data stripe that are stored in the flash memory dice. For example, PA is the parity chunk for the data stripe 404A; therefore, PA may be computed based on the data chunks A0 . . . AN. The meta-data parity chunk PN is parity computed from the plurality of parity chunks previously generated. Therefore, PN is computed based on the parity chunks PA . . . PN.

In some implementations, the parity chunks and the meta-data parity chunk in the parity stripe are selectively stored on different flash memory die so that data can be recovered in response to a failure, removal, and replacement of a flash memory die. Each data chunk in a stripe is also stored in a different flash memory die so that data can be recovered in response to a failure, removal, and replacement of a flash memory die. For example, for the data stripe A, the data chunk A0 is stored in the flash memory die 402A, data chunk A1 is stored in the flash memory die 40B, data chunk A2 is stored in the flash memory die 402C, and the data chunk AN is stored in the flash memory die 402N.

The parity chunks and the meta-parity chunk can be stored arbitrarily across the flash memory dice 402A . . . 402N provided their locations are known. For example, as shown, the PA chunk in the parity stripe 406 is stored in the flash memory die 402A, the PB parity chunk is stored in the flash memory die 402B, the PC parity chunk is stored in the flash memory die 402C, and the meta-parity chunk PN of the parity stripe 406 is stored in the flash memory die 402N. In another implementation, the meta-parity chunk PN may be stored in the flash memory die 402A, the PA parity chunk may be stored in the flash memory die 402B, the PB parity chunk may be stored in the flash memory die 402C, and the PC parity chunk may be stored in the flash memory die 402N.

In a particular flash memory die, data chunks from each data stripe and a parity chunk are stored in different 512 byte or 1 KB regions of the same flash write page or erase block. For example, the A0 data chunk in the data stripe 404A, the B0 data chunk in the data stripe 404B, the M0 data chunk in the data stripe 404M and the PA parity chunk are stored in different regions of the same size in the same flash memory page in the same flash memory die 402A. The data stripes and the parity stripe are stored at different offsets in the flash write page or erase block. Each flash write page or erase block for the flash memory dice 402A . . . 402N is logically written in a similar format.

As indicated previously, a RAID group, which also referred to simply as a RAID, or similar configuration may be used to provide data reliability to the data stored in the flash memory dice 402A . . . 402N. For example, to provide RAID-like reliability, four, eight, or sixteen flash memory dice may be used. The RAID group may reside across other number of dice.

As shown, M data stripes and one parity stripe are written across N flash memory dice 402A through 402N for each flash write page. The data and parity are striped across multiple write pages, erase blocks or some other suitable memory unit in the different flash memory dice. The data stripes and parity stripes are written to different offsets within one or a couple of flash write pages, erase blocks or some other suitable memory unit, for each constituent flash memory die. The parity chunk PA is a result of determining the parity of the data stripe 404A. The parity chunk PB is a result of determining the parity of the data stripe 404B. The parity chunk PM is a result of determining the parity of the data stripe 404M. PN represents the parity meta-data chunk stored in a flash memory die 402N with its value being the parity of the parity data chunks PA through PM.

The system may be configured to be responsive to the relative size of "data chunk" sizes and the use of a particular data chunk size relative to the impact on the system. A data chunk may have a size equivalent to an erase block, or some other suitable unit of size associated with the memory. For example, each of A0 ... AN may correspond to an erase block in the respective flash memory die 402A ... 402N. In such cases, data associated with the stripe 404A may be written to the erase blocks A0 through AN in the flash memory dice 402A through 402N, respectively.

As described above, in addition to the striping, the data may be redundantly stored in different flash memory dice at the granularity of erase blocks, or some other suitable unit of size associated with the memory. For example, data that is striped in 404A in data chunks of size equivalent to erase blocks may be replicated in a different group of flash memory dice. In some implementations, the data may be redundantly stored using parity encoding, such as XOR encoding, as described previously. In some other implementations, the data may be replicated using mirroring, while in some other implementations, the data may be redundantly stored using some suitable combination of parity encoding and mirroring, and/or some other appropriate mechanisms.

In one configuration, the data chunks for a data stripe may be written to 8 flash memory dice. Referring to the example of a flash memory die package with 8 dice arranged in 4 pairings with one die of each pair active at a given time for I/O operations, the above configuration may include the 4 active (considered from an I/O operations perspective) dice from one package, such as 212, and 4 active dice from another package, such as 214. The data chunks written to the 4 active dice in a package may be replicated in the other 4 sibling dice in the respective package. In this manner, the data may be striped and replicated to provide RAID-like reliability. In some implementations, depending on factors such as the configuration of the slave controller and channels relative to the number of memory dice, other configurations may be used. For example, the data chunks may be striped across 8 different dice in 8 different packages along with parity encoding to provide the ability to reconstruct the data chunks in the event of the loss of any single die or package.

A group of flash memory dice that are involved in storing and replicating data in the above manner may be considered to constitute a RAID group. In the present context, a RAID group is associated with a collection of erase blocks that are aligned at the same memory address offset for each flash memory die in the RAID group. In the above example, the RAID group constitutes 16 flash memory dice across 2 packages. The RAID group has a "width" of 8, that is, data chunks in a data stripe are stored across 8 flash memory dice and replicated in 8 other flash memory dice.

In some implementations, the memory card 200 may utilize a log-based structure for efficiently writing small blocks of data to the group 400 of flash memory dice 402A ... 402N. This may be achieved by allocating some portions of the flash memory dice to be used as the log structure for storing data associated with the operating system or the applications, and using some other portions of the flash memory dice for the reconciled storage, in which the data may be committed. The log-based structure may be managed, for example, by the master controller, or the software driver, or by a suitable combination of both.

In some cases, the application may perform random 512 byte writes over the entire group of flash memory dice, or over the entire logical address space that is used by the memory card 200. Considering the granularity of the translation unit being 4 KB, the 8-way expansion cannot be avoided in such cases. However, the effect of the write amplification may be mitigated in cases where the writes are not fully random by dividing the log structure into "streams," which are a set of buffers in which the incoming small block data are temporarily stored, before the data are committed to the reconciled storage.

In some implementations, the small writes issued by an application tend to be sequential in nature, which means that if a 512 byte data block is written at offset X in a stream buffer, the next 512 byte data block is written at offset X+1 in the same stream buffer, the subsequent small block at offset X+2 in the same stream buffer, and so on. A small number of threads or application processes may perform write operations for small blocks that use the log-based structure. For example, a handful, such as 4 or 8 processes or threads, may be doing the smaller writes at a time. In such implementations, there may be a different stream associated with each thread or process. Efficient reconciliation may be achieved by committing the small blocks of data to the reconciled storage in a form that maintains the sequential pattern in which the data are written to the stream buffer.

In some other implementations, the flash memory card 200 may implement a single log-based structure for initial writes of the small blocks. In such implementations, all small blocks that are received by the memory controller are written to the same log in the physical flash memory, irrespective of the thread of process that is associated with the small blocks. Groups of small blocks are committed to the reconciled portions of the physical flash memory based on certain triggers. For example, the data may be reconciled periodically, when the filled capacity of the log reaches a certain threshold, when small blocks that together make up a cohesive translation unit are present in the log, or for some other suitable reason.

The following sections describe write operations for small blocks using a log-based structure in the context of stream buffers. However, the description is equally applicable to small block writes that use a single log structure, as outlined above.

Figure 5:
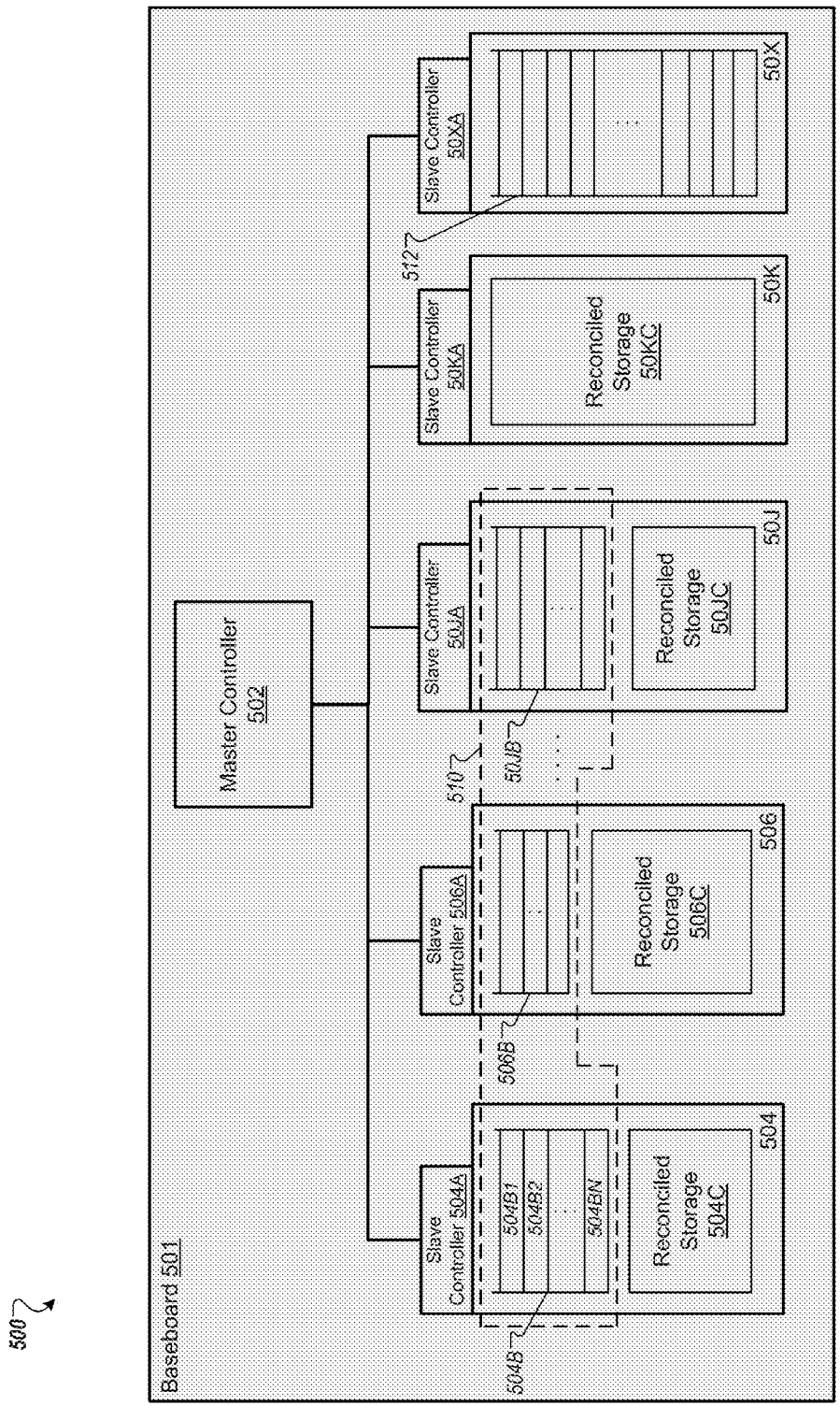
FIG. 5 illustrates an example of a flash memory device that uses a log-based structure with stream buffers for small block write operations.

FIG. 5 illustrates an example of a flash memory card 500 that uses a log-based structure with stream buffers for small block write operations. The memory card 500 may be the same as the memory card 200 included in the system 100. FIG. 5 shows the baseboard 501 of the memory card 500 that includes a master controller 502, which manages the flash memory dice 504, 506, 50J and 50K ('J' and 'K' being integers) through the slave controllers 504A, 506A, 506JA and 50KA respectively. A subset of the flash memory dice include stream buffers 504B, 506B and 50JB. All the flash memory dice include reconciled storage 504C, 506C, 506JC and

50KC. Each stream buffer temporarily stores one or more small blocks, such as 504B1, 504B2 and 504BN stored in 504B. The stream buffers together constitute the log-based structure 510.

In some implementations, the memory card 500 also may include an additional memory 50X that is managed by the master controller 502 through the slave controller 50XA. The entirety of the memory 50X may be used as log-based structure 512.

Although FIG. 5 shows the log-based structure 510 composed of portions of three flash memory dice 504, 506 and 50J, the log-based structure 510 may include portions of other flash memory dice that are not shown. For example, the log-based structure 510 may include portions of 8, 16 or some other suitable number of flash memory dice. Accordingly, the number of stream buffers in the log-based structure 510 may be 8, 16, or some other suitable number. In some implementations, the number of stream buffers in the log-based structure 510 may be based on the number of threads or processes that are performing small block writes to the memory card 500.

As discussed previously, the amount of physical memory in each flash memory die that is allocated to the log-based structure and the amount that is allocated to reconciled storage may vary from one die to another. For example, as shown in FIG. 5, the space allocated to the log-based structure 506B in flash memory die 506 is different from the space allocated to the log-based structure 504B in flash memory die 504 or 50JB in flash memory die 50J. Similarly, the space allocated to the reconciled storage 506C in flash memory die 506 is different from the space allocated to the reconciled storage 504C in flash memory die 504 or 50JC in flash memory die 50J.

Some of the flash memory dice may not allocate any space to the log-based structure. For example, all the space in the flash memory die 50K is allocated to the reconciled storage 50KC, and none is allocated to the log-based structure.

The system may update the portions of the flash memory dice that are allocated to the log-based structure and to the reconciled storage dynamically at runtime based on different metrics, such as the application load or the throughput of the write operations to the reconciled storage. For example, the master controller 502 and/or the software driver may compute the percentage of the total application workload that is for writing small or ultra-small blocks. Based on the computation, the master controller 502 and/or the software driver may configure a portion 504B, 506B and 50JB of the physical space in the flash memory dice 504, 506 and 50J respectively for the log-based structure 510. The total physical space that is allocated to the log-based structure is proportional to the computed percentage. At a later point in time, the master controller 502 and/or the software driver may re-compute the percentage of the total application workload writing small or ultra-small blocks to be different from the previous value. Accordingly, at the later point in time, the master controller 502 and/or the software driver may configure a different portion of the physical space on the flash memory dice 504, 506, 50J and 50K for the log-based structure 510. The updated portion dedicated to the log-based structure may be proportional to the recomputed percentage.

The flash memory dice 504, 506, 50J and 50K may belong to the same package, or they may belong to different packages. As described previously, in some implementations, the slave controllers 504A, 506A, 50JA and 50KA may be mounted to the packages associated with the flash memory dice 504, 506, 50J and 50K respectively and coupled between the master controller 502 and the respective flash memory dice. In some other implementations, the slave controllers 504A, 506A, 50JA and 50KA are mounted to the baseboard 501 and coupled between the master controller 502 and the flash memory dice in the associated packages. In yet other implementations, the slave controllers 504A, 506A, 50JA and 50KA are mounted together in an integrated circuit package with the master controller 502 and coupled between the master controller 502 and the flash memory dice in the associated packages.

In some implementations, the write operations to the log-based structure 510 may be managed by a combination of the master controller 502, a subset of the slave controllers, such as 504A, 506A and 50JA, and the software driver element of the host system for the memory card 500. For example, the software driver element is the first entity in the flash memory system that receives a write request from the application or operating system. The software driver element determines whether the request is a log write, that is, whether the memory write operation is for a small block, or whether the request is for non-small block sized data, that is, for data of size equivalent to a translation unit or higher. If the request is determined to be a log write, the software driver element directs the write to the log portion of the flash memory card 500, and performs the write operation by interacting with the master controller 502 and the slave controllers 504A, 506A and 50JA that would otherwise have been involved in a regular write.

In some other implementations, the write operations to the log-based structure 510 may be managed by the application or the operating system that requests the write operations. For example, the application or the operating system may control the software driver element, or the master controller 502, or both, for performing the write operations.

In some implementations, the subset of the slave controllers used for writing to the log-based structure 510 depends on the width of the data striping implemented in the flash system. For example, a regular write may get striped eight ways, and therefore involve the slave controllers that control the eight flash memory dice involved. On the other hand, a log write may get striped two ways. Therefore, the log write may involve the subset of the slave controllers that control the two flash memory dice involved in the log write.

As indicated previously, 504B1, 504B2 . . . 504BN may correspond to the small block writes that are performed on the stream buffer 504B. The size of each of 504B1, 504B2 . . . 504BN may vary in range from, say, 128 bytes to, say, 1 KB. In some implementations, the sizes of all of 504B1, 504B2 . . . 504BN may be the same, such as 512 bytes. Each stream buffer, such as 504B, may be preconfigured with small block regions of equal size. In some other implementations, the sizes of 504B1, 504B2 . . . 504BN may differ from some or all others. In such implementations, the sizes of 504B1, 504B2 . . . 504BN may be dynamically determined based on the sizes of the small block writes corresponding to each. For example, 504B1 and 504BN may correspond to small blocks of size 128 bytes each, and therefore the sizes of 504B1 and 504BN may be 128 bytes each; 504B2 may correspond to a small block of size 256 bytes, and therefore the size of 504B2 may be set to 256 bytes at the time of writing the 256-byte small block to 504B2.

In some implementations, the data in the stream buffer hosted by a flash memory die may be written to the reconciled storage that is hosted by a different flash memory die. For example, small blocks 504B1, 504B2 . . . 504BN may be reconciled to any of the reconciled storage 504C, 50JC . . . 50KC. However, in some other implementations, there may exist a one-to-one correspondence between a stream buffer and a reconciled storage area. The one-to-one correspondence may be based on the flash memory die that is shared by the stream buffer and the reconciled storage. For example, in such implementations, the small blocks in stream buffer 504B may be written exclusively to reconciled storage 504C, data from 506B may be reconciled to 506C, and data from 50JB may be committed only to 50JC.

Each of the stream buffers 504B, 506B . . . 50JB may be associated with a different thread or process. When a write request for a small block application data is received by the memory card 500, the master controller 502 and/or the software driver attempts to determine which stream buffer is the most suitable temporary storage for the data. In some implementations, the memory controller tags the write request with some context information, which may be based on the process, or the identifier of the process that is requesting the write operation. The small block is then written into a stream buffer that is associated with that context. When the next write request is received for the same context, with very high probability the small block data will be written to the same stream associated with the particular context. This may be useful in ensuring that, when the small blocks are written to the reconciled storage, the offsets X, X+1, X+2, etc., are very close to one another. Therefore, the system attempts to ensure that small blocks with the same context are written sequentially in the log-based structure 510.

When the small blocks that are written sequentially, as described above, are ready to be reconciled to a larger 4 KB translation unit in the flash, the master controller 502 and/or the software driver element of the host system has to look in the neighborhood of the log-based structure 510 to find the data that can be merged together to prepare the new 4 KB write page. For example, when reconciling a small block write corresponding to 504B2, the master controller 502 may look only in the stream buffer 504B to find other small blocks that can be included in a write page with 504B2. Considering small blocks of size 512 bytes each, if all the eight small blocks that make up the 4 KB are found in one stream buffer, the write operation to the reconciled storage may be significantly more efficient in comparison to the case where each 512 byte small block is reconciled in isolation, that is from dissimilar stream buffers, to the 4 KB write page.

In the context of write amplification, the write amplification can be reduced to a 2-way expansion using the contextual stream buffer mechanism described in the preceding section. The system first writes into the log-based structure 510, for example, to any of the stream buffers 504B, 506B . . . 50JB. At the second write, the data that is in the log-based structure 510 is written into the 4 KB write page that is in reconciled storage, such as in one or more of 504C, 506C, 50JC . . . 50KC. By writing the data into different stream buffers based on the context, the efficiency of reconciliation may be improved.

In some implementations, each stream, such as 504B, 506B or 50JB, may be multiple gigabytes (GB) in size. Given a certain amount of flash resources, say 1 TB, the physical space is carved up by the system into the stream buffers and the reconciled storage. For example, 100 GB may be used for the log-based structure 510, which is divided into eight groups logically (streams), such as 504B, 506B . . . 50JB. The rest of the physical space may be used to store the data in the reconciled state, such as 504C, 506C and 50JC. In this example, the ratio of the split between the log-based structure and the reconciled storage is 1:9. However, if the application workload is such that a majority of the write requests is for small block data, which may be the case in the context of high-frequency trading applications, the system may dynamically shift the boundary to, say, 500 GB for the log-based structure 510 and 500 GB for the reconciled storage. By devoting more space to the log writes, the chances of effectively reconciling the data at a later time may be improved.

Mechanisms for redundancy may be associated with the log-based structure 510, which are different from the redundancy/replication mechanisms associated with the reconciled storage. In some implementations, different forms of small block writes that are saved to the stream buffers may have different redundancy structures encoded with them. A small block data unit initially may be stored in the log-based structure with a certain redundancy that is different from the redundancy used in the reconciled state. Because of the small sizes of the data written to the stream buffers, a high redundancy may be used to absorb the write efficiently. For example, for small block writes in the log-based structure 510, there may be 1-in-4 redundancy. For metadata or ultrasmall blocks, the redundancy may be 1:1. Accordingly, the system may perform a 1:1 log write redundancy. In comparison, when a full write is performed to reconciled storage, a more efficient write may be achieved, such as 1-in-8 redundancy. Therefore, reconciling the small blocks written to the log-based structure may be useful because upon reconciling, the redundancy structure can be changed from 1:1 or 1-in-4 to 1-in-8.

In some implementations, the memory card 500 may use a dedicated memory for a log-based structure. For example, the memory card 500 may use the memory 50X entirely as a buffer for log-based writes, with 512 being the associated log-based structure. The log-based structure 512 may be used as an alternative, or in addition, to the log-based structure 510. Accordingly, the master controller 502 may control the memory 50X separately from the flash memory dice 504, 506, 50J or 50K.

In implementations where the log-based structure 512 is used as an alternative to 510, all the small block writes are temporarily stored in the log-based structure 512 that is implemented in the memory 50X. The flash memory dice may be used entirely for reconciled storage, for example as shown in 50K. At periodic intervals, the master controller 502 reconciles the small block writes that are stored in the log-based structure 512 to the flash memory dice, such as 50K. This may be useful in situations where the longevity of the flash memory dice is an issue, since moving the log-based structure to a separate memory, away from the flash memory dice used as reconciled storage, may enhance the life of the flash memory dice due to the lesser number of operations that are now performed on the flash memory dice (since there are no temporary storage associated with the flash memory dice in such implementations). However, the memory bus utilization may be increased, since initially data is moved to the memory 50X, and then from the memory 50X to the flash memory dice, such as 50K. The life of the memory 50X may be reduced, but this might be acceptable in systems where the memory 50X is replaced more frequently than the flash memory dice used as reconciled storage.

The memory 50X itself may be a flash memory die. However, in some implementations, the memory 50X may be some other type of memory, such as a RAM or a hard disk. In implementations where the memory 50X is non-persistent memory (such as RAM), then provisions may be implemented to ensure that the small block writes that are temporarily stored in the log-based structure 512 are protected against power cycles, among other conditions. For example, a backup power (such as a battery) may be supplied to the memory 50X. However, in some implementations where 50X is non-persistent memory, the system 500 may allow for data losses. In such implementations, no backup power may be supplied to 50X, with the consequence that the small block writes that are written to the log-based structure 512 may be lost in the event of a power cycle.

The memory card 500 or the host system may periodically perform a garbage-collection process, which involves examining the data stored in the flash memory dice, determining whether data is valid or invalid, and removing the invalid data. Typically, there is a single garbage collection process, for example, when log-based writes are not used. However, in some implementations that has been augmented with log-based writes, there may be two garbage-collection processes used. In such implementations, the original garbage-collection process in the system may attempt to relocate a data in a certain region of the reconciled storage. In doing so, the garbage-collection process may encounter a 4 KB block or write page that is not completely invalid, but is partially invalid. For example, there may a 512 byte sector in a portion of the 4 KB write page that has an updated version residing in a stream buffer in the log-based structure 510, whereas the remaining 512 byte sectors in the 4 KB write page include valid data. In such a situation, the garbage-collection process may perform an "opportunistic reconciliation."

Referring to the preceding example, in opportunistic reconciliation, the master controller 502 and/or the software driver element of the host system retrieves the 7 of the 8 512 byte sectors that are valid in the 4 KB write page, merges the retrieved sectors with the one 512 byte sector that is present in the log-based structure 510, and then writes the updated 4 KB write page to reconciled storage. Upon a successful write to the reconciled storage, the master controller/software driver invalidates both the old 4 KB write page in the reconciled storage and the 512 byte entry in the log-based structure 510 because they have already been reconciled.

In the above example, say that the updated 512 byte small block in the log-based structure 510 is stored in unit 24 of a stream buffer that is 100 units long. As part of the garbage-collection process on the reconciled storage, the master controller/software driver may merge the unit 24 data with the 4 KB write page that is currently garbage collected, and write the new 4 KB write page to a new location in the reconciled storage. Then the master controller/software driver makes a note that unit 24 of the stream buffer is no longer valid. This may be useful so that the master controller, or the software driver, or both do not come back at a later point in time and try to reconcile unit 24 again.

Accordingly, in some implementations that use log-based writes, the traditional garbage-collection process may be augmented to do opportunistic reconciliation because for portions of 4 KB write pages in reconciled storage that are being garbage collected, updated data might be present in the log-based structure. Therefore, in a log-based scheme, reconciliation may be performed using one of two mechanisms: either a direct reconciliation, where 4 KB data in the log-based structure is written to the reconciled storage, or an opportunistic reconciliation as the system is performing garbage collection in the reconciled storage portions of the flash memory dice.

Both direct reconciliation and opportunistic reconciliation may be based on triggers. In some implementations, a trigger may be the amount of free space in the stream buffers included in the log-based structure 510. Additionally, there may be a secondary trigger for the log reconciliation, which is reconciliation efficiency. In case of the latter, the system may have a tracker for each stream buffer. A tracker may be a software process that monitors the number and sequence of small blocks present in the associated stream buffer. Upon determining that high storage efficiency may be achieved, the tracker may attempt to reconcile the associated stream buffer, even if a space constraint does not exist in the stream buffer at that time. For instance, if all eight 512 byte sectors of a 4 KB write page are present in the associated stream buffer, the tracker may reconcile the data immediately.

The portion of the physical memory in each flash memory die that is used for the log-based structure 510 versus the portion that is used for reconciled storage may vary with time, based on the application load, the throughput of the write operations to the reconciled storage, or for some other suitable reason. For example, for the flash memory die 504, the size of the stream buffer 504B may increase or decrease at different times as the number of small block writes associated with the stream buffer 504B increases or decreases. There may be corresponding change in the size of the reconciled storage 504C.

In some implementations, the same region of a flash memory die may be used either to hold the small block data, or for the reconciled storage, at different points in time. There is no apriori association of stream buffers or log regions to portions of the flash memory dice—the log portion and the reconciled portion may be considered to be primarily logical constructs. The logical view maps to the same areas of the physical flash space dynamically to provide global wear-leveling and the flexibility in writing the small blocks of data to the flash memory 500.

The flash memory card 500 may be used to perform memory read operations for small and/or ultra-small blocks of data. A read operation may refer to data that is partly in the log-based structure 510 and partly in the reconciled storage. For example, the read operation may correspond to a translation unit of 4 KB that has 512 bytes of data stored in the log-based structure 510. The master controller 502 and/or the software driver has to determine the current state for the 4 KB logical block of data requested by the read operation.

The master controller 502 and/or the software driver maintains a translation table that maps a logical block address (LBA) to a physical block number (PBN), which indicates the physical locations in one or more flash memory dice where the data are stored. In some implementations, the translation table may be a dynamic RAM (DRAM) structure that is distinct from the flash memory dice 504 . . . 50K. However, in other implementations, the translation table may be stored in a dedicated portion of one or more flash memory dice, or in some other suitable location.

The translation table includes information indicating where in the reconciled storage the requested 4 KB logical block of data is stored. The translation table also indicates that the 4 KB logical block may have some of its contents stored in the log-based structure 510.

In some implementations, the translation table maintains tags for the logical blocks as they are stored in a split manner, across the reconciled storage and the log-based structure 510. The tag is created as part of the original write operation. When a portion of the 4 KB logical block or translation unit is written to the log-based structure, the master controller 502 and/or the software driver makes modifications to the translation table, so that future read operations to the particular logical block is aware that the contents of the logical block are split between the reconciled storage and the log-based structure.

The flash memory card 500 maintains a secondary translation table structure that is used to determine where in the log-based structure portions of a logical block may be found. The secondary translation structure maps sub-blocks of a translation unit, what is referred to as sectors, to physical locations in the log-based structure 510. A sector provides the granularity at which data are written into the log-based structure as part of a write operation. A sector is typically smaller in size than a translation unit. In some implementations, a sector is 512 bytes or 1 KB in size.

The secondary translation structure may be maintained in DRAM where the primary translation table is maintained. This may be the DRAM at the host device or some other memory structure to which the master controller 502 and/or the software driver have access. In some implementations where the software driver runs on the host CPU, the secondary translation table is maintained in the host DRAM. In other implementations, where the software driver runs on an embedded CPU associated with the master controller 502, the secondary translation table is maintained in memory resources that are tied to the embedded CPU.

When performing a read operation, the master controller 502 and/or the software driver examines the main translation table to determine whether the requested logical block of data is split between the reconciled storage and the log-based structure 510. If the logical block is not split, then the master controller may proceed with performing the read operation on the reconciled storage as is.

On the other hand, if the requested logical block of data is split between the reconciled storage and the log-based structure 510, then the master controller 502 and/or the software driver has to read the sub-blocks of data from both the reconciled storage and the log-based structure, reconcile the sub-blocks together and present the complete block to the operating system or higher-level application as a response to the read request.

To read the sub-blocks that are stored in the log-based structure, the master controller 502 and/or the software driver examines the secondary translation table structure and determines where in the log-based structure the data is present. The location in the log-based structure that is mapped by the secondary translation table structure may be an address offset into one of the stream buffers 504B, 506B and 50JB, or an address offset into a single buffer that implements the log-based structure, as the case may be.

The information in both the primary translation table and the secondary translation table are kept up to date as part of the write operations, which includes the initial write operations as well as the reconciled write operations. After reconciliation is performed, the original translation table entry is updated to point to the new locations in the reconciled storage and/or the log-based structure where the reconciled logical block of data may be found.

In some implementations, reconciliation may be triggered when the memory resources that are set aside for the secondary translation table are themselves constrained, that is the secondary translation table structures have reached the exhausted the memory space available to the secondary translation table structures. This may be the case, for example, when the small-block write operations are mostly random such that the secondary translation table structures are filled up faster than the log structures.

The flash memory card 500 may be used to perform memory recovery operations for small and/or ultra-small blocks of data. When performing a write operation for a small or ultra-small block of data, the master controller 502 and/or the software driver writes appropriate translation information for the small block into a meta-log. The meta-log is a data structure that is configured for storing the translation entries, and is used to re-create the translation table after a power-failure event.

A recovery operation may be executed after an unplanned event, such as a power outage, that causes the primary and the secondary translation structures to be lost. As part of the recovery operation, the master controller 502 and/or the software driver parses the meta-log structures to re-create the translation tables.

In some implementations, the meta-log is written in a separate region of the flash memory dice than the region where the small or ultra-small block of data is stored. This may be efficient because in order to write one unit of data, the system effectively performs two write operations. For example, for doing a 512 byte write operation, the system writes not only the 512 byte, but also writes a translation entry in a separate region of the memory, resulting in two memory operations to absorb a single small block write. This may add to the response time for a write operation.

In some implementations, instead of maintaining a separate and distinct meta-log structure, the translation entries are written adjacent to the data. For example, when writing a 512 byte small block, the system stores, in addition to the 512 byte block, 16 extra bytes that effectively act as metadata for the 512 byte data block. By writing the metadata together with the small block, lower response time may be achieved in looking up the metadata, which results in better performance of the small block writes. The number of bytes that are used for the metadata may be 16, 32, or any other suitable number.

While writing the additional metadata bytes along with the data block removes the performance hit due to additional latency of two write operations in separate regions of flash, at the same time a small latency is added by the write operation for the metadata bytes. However, the latency is dominated by the number of memory operations that are performed on the flash memory dice, and not by the amount of data that are written as part of the memory operations. Hence, the two separate write operations result in much more latency compared to writing the additional bytes of metadata. Therefore, by performing the metadata writes adjacent to the small block storage, the overall latency may be reduced considerably in comparison to performing two separate write operations, one for storing the small data block, and the other for updating the separate meta-log structure.

Since the ultra-small blocks are written in log fashion, the metadata entries that are written along with the data blocks may be considered effectively as forming a meta-log. From a corrective point of view, the log nature of the small-block writes provides the same information that would have been available from a separate meta-log structure. From a recovery point of view, the master controller 502 and/or the software driver examines the various log stream buffers in addition to the original meta-log. Together, these two portions of the flash memory device provides information about the complete meta-log structure.

Figure 6:
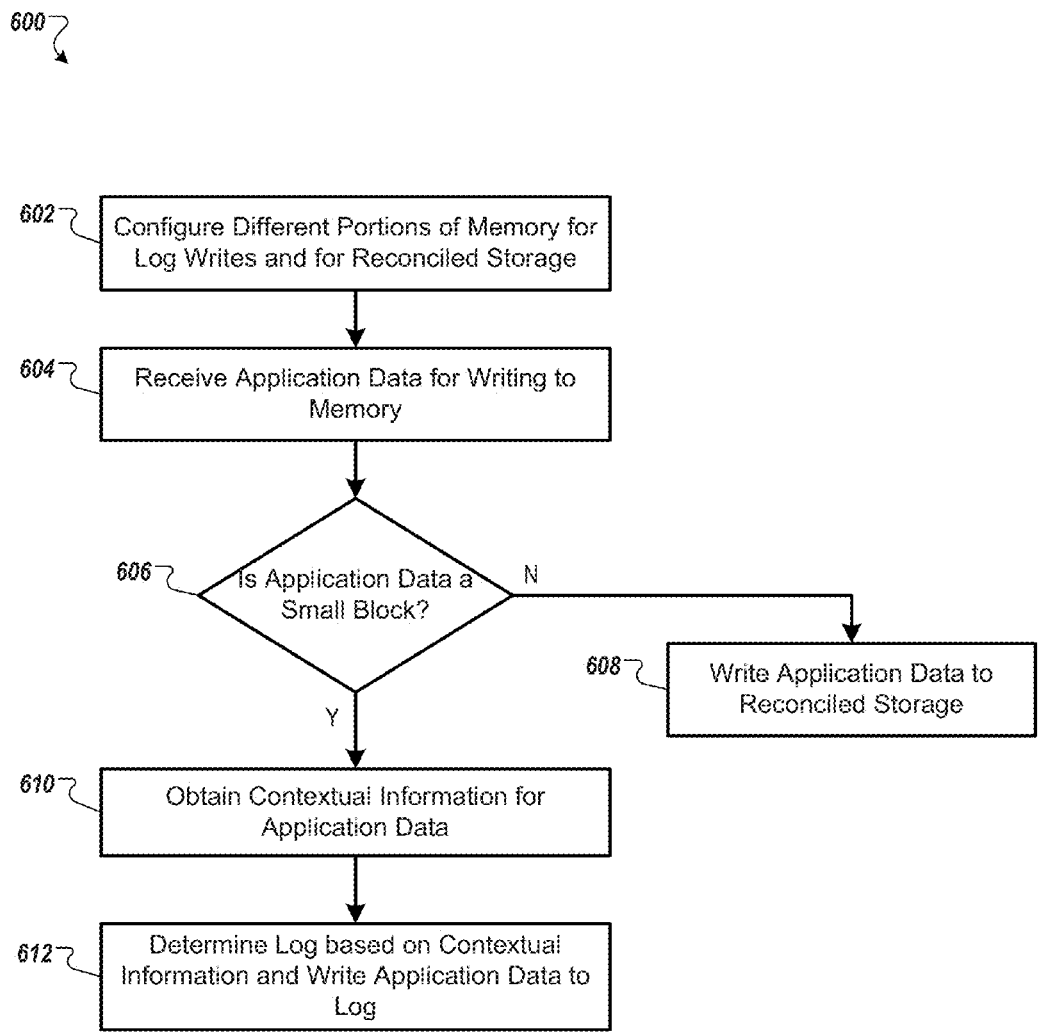
FIG. 6 illustrates an exemplary process that may be used for writing small blocks of data to a log-based structure implemented in a flash memory device.

FIG. 6 illustrates an exemplary process 600 that may be used for writing small blocks of data to a log-based structure implemented in a flash memory device. The process 600 may be performed on the memory card 500. The following sections describe the process 600 as performed by the master controller 502 in conjunction with a suitable combination of the slave controllers 504A, 506A, 50JA, 50KA, and the software driver element for the host system that includes the memory card 500. However, the process 600 also may be performed by other systems and system configurations.

The process 600 configures different portions of memory for log writes and reconciled storage (602). For example, the master controller 502 and/or the software driver of the host system for the memory card 500 may configure some portions of the physical flash space in the memory card 500 for the log-based structure 510, and some other portions for the reconciled storage. In one implementation, portions of the flash memory dice 504, 506, 50J and 50K are configured as stream buffers 504B, 506B and 50JB respectively, which constitute the log-based structure 510. Other portions of the flash memory dice 504, 506, 50J and 50K are configured as the reconciled storage 504C, 506C, 50JC and 50KC respectively. As described previously, the portions of the flash memory dice that are configured as stream buffers or reconciled storage may vary dynamically based on the application load. Therefore, the master controller/software driver may reconfigure the stream buffer and reconciled storage portions of the flash memory dice periodically.

Application data is received for writing to the memory (604). For example, the software driver element that manages the memory card 500 may receive a data block from an application or operating system for writing to the memory card 500.

It is determined whether the application data is a small block (606). For example, the software driver element may check the size of the received data block and compare to preconfigured thresholds. In some implementations, data blocks of size smaller than a translation unit may be determined to be small blocks. For example, considering a 4 KB translation unit, a data block that is 3 KB may be considered to be a small block. In other implementations, data blocks that are considerably smaller than a translation unit may be taken to be small blocks. For example, data blocks smaller than 1 KB may be considered as small blocks, even if the translation unit is 4 KB.

If it is determined that the application data is not a small block, the application data is written to the reconciled storage (608). For example, the software driver element may determine that the size of the application data block exceeds the threshold for small blocks. Then the software driver element sends the application data to the master controller 502 with instructions to write the data directly to the reconciled storage. Based on the instructions from the software driver element, the master controller 502 writes the application data to the reconciled storage, such as to one of 504C, 506C, 50JC or 50KC, by working in conjunction with the slave controller associated with the selected reconciled storage.

On the other hand, if it is determined that the application data is a small block, contextual information is obtained for the application data (610). For example, the software driver element may determine that the size of the application data block is within the threshold for small blocks. Consequently, the software driver element sends the application data to the master controller 502 with instructions to perform a log write on the application data. Upon receiving such instructions from the software driver element, the master controller 502 attempts to obtain contextual information associated with the application data. For example, the master controller 502 determines the thread or process that requested the write operation for the application data. In this context, determining the thread or process refers to the master controller determining a unique identifier that represents the thread or process, which can be compared with the corresponding identifier for a subsequent write request.

A log is determined based on the contextual information and the application data is written to the log (612). For example, upon identifying the thread or process that sent the application data, the master controller 502 determines the stream buffer that is used for temporary storage of the small blocks associated with the identified thread or process. In this context, a log is the same as a stream buffer. Then the master controller 502 coordinates with the slave controller for the flash memory die hosting the determined stream buffer to write the application data to the stream buffer.

Figure 7:
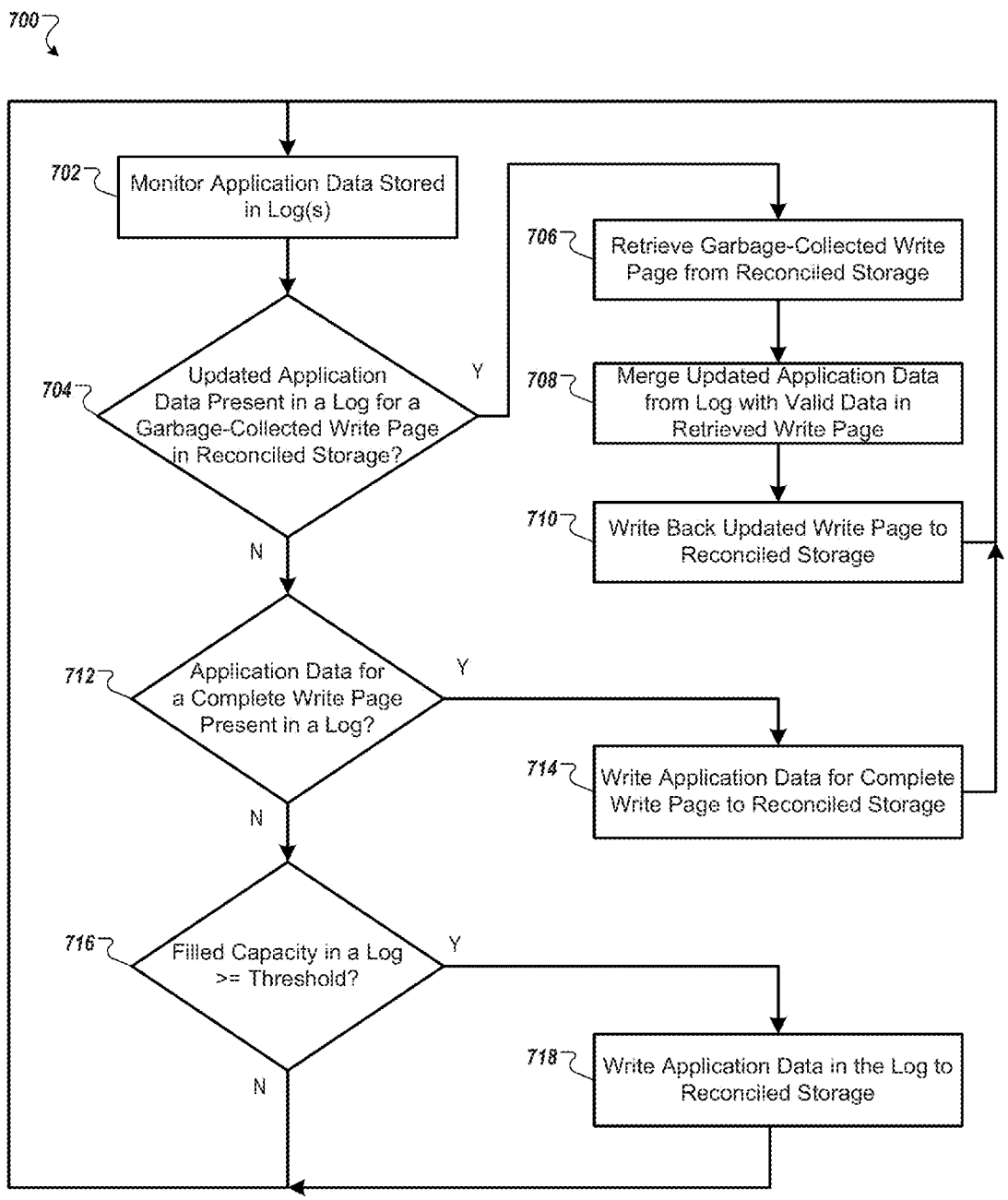
FIG. 7 illustrates an exemplary process that may be used for reconciling small blocks of data from a log-based structure to the reconciled storage in a flash memory device.

The data that is written to the log-based structure using the process 600 is saved to the reconciled storage based on certain triggers or thresholds, as described previously. FIG. 7 illustrates an exemplary process 700 that may be used for reconciling small blocks of data from a log-based structure to the reconciled storage in a flash memory device. The process 700 may be performed on the memory card 500, for example, in conjunction with the process 600. The following sections describe the process 700 as performed by the master controller 502 along with a suitable combination of the slave controllers 504A, 506A, 50JA, 50KA and the software driver element for the host system that includes the memory card 500. However, the process 700 also may be performed by other systems and system configurations.

Application data that is stored in log(s) are monitored (702). For example, depending on the system, small blocks of application data may be stored in a single log, or in several logs, such as the stream buffers 504B, 506B . . . 50JB. For each stream buffer, the master controller 502 may monitor the total number of small blocks stored in the stream buffer, and also the sequence of the small blocks.

It is determined whether updated application data is present in a log for a garbage-collected write page in reconciled storage (704). For example, as part of performing garbage collection on the reconciled storage, the master controller 502 may encounter a 4 KB block or write page that is partially invalid. In such cases, the master controller 502 may check whether updated data corresponding to invalid portion of the write page is present in any stream buffer. As described previously, this may be done for opportunistic reconciliation of the data stored in the log-based structure 510.

If it is determined that updated application data is present in a log, the corresponding garbage-collected write page is retrieved from the reconciled storage (706). For example, the master controller 502 may retrieve the valid portions of the write page from the reconciled storage.

Updated application data from the log is merged with valid data in retrieved write page (708). For example, the master controller 502 merges the valid portions of the write page that are retrieved from the reconciled storage with the identified small block in the stream buffer that includes valid data for the remaining portion of the write page.

The updated write page is written back to the reconciled storage (710). For example, the master controller 502 updates the write page by merging the small block with the retrieved portions of the write page. Then the master controller 502 writes the updated write page to the reconciled storage. In addition, upon a successful write to the reconciled storage, the master controller 502 invalidates both the old write page in the reconciled storage and the relevant small block entry in the stream buffer because they have already been reconciled.

Other than determining whether updated application data is present in a log for garbage-collected write pages, it is checked whether application data for a complete write page is present in a log (712). For example, the tracker associated with each stream buffer may check the small blocks present in the respective stream buffer for application data that form a cohesive write page.

If it is determined that application data for a complete write page is present in a log, the application data for the complete write page is written to the reconciled storage (714). For example, if a tracker determines that all small blocks corresponding to a write page are present in the associated stream buffer, the tracker may write the small blocks to the reconciled storage, even if a space constraint does not exist in the stream buffer at that time. As described previously, such reconciliation may be done in an attempt to achieve high storage efficiency.

Aside from checking whether application data for a complete write page is present in a log, it is determined whether the filled capacity in a log is same as or greater than a threshold (716). For example, the master controller 502 may monitor how much of the storage area in each stream buffer are filled at a time. As part of monitoring a stream buffer, the master controller 502 may check whether the data in the stream buffer exceeds the threshold amount at which the small blocks are written to reconciled storage. Conversely, the master controller 502 may check whether the available free space in the stream buffer is below a threshold. In this context, the thresholds may be preconfigured system parameters. In some implementations, the thresholds may be periodically updated based on the frequency of write operations being performed, the occupancy levels of the stream buffers, or based on some other suitable metric.

If it is determined that the filled capacity in a log is same as or greater than a threshold, the application data in the log is written to the reconciled storage (718). For example, the master controller 502 may determine that the data in a stream buffer has exceeded the threshold amount. In such a case, the master controller 502 may perform a direct reconciliation of the data in the stream buffer by writing the small blocks present in the stream buffer to the reconciled storage.

The conditions (704), (712) and (712) may be performed concurrently by the flash memory system. In addition, the system may perform the checks continuously such that the small block data are reconciled efficiently, without incurring high write amplification or high latency for performing the write operations.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising a non-transitory computer-readable medium storing instructions that are executable by a processor and upon such execution, configured with modules that cause the processor to perform operations, the modules comprising:

a first configuring module that configures a first portion of an asymmetric memory as a temporary storage for application data units with sizes corresponding to a small memory block that is smaller than the size of a logical write unit associated with the asymmetric memory, wherein latency of read operations is different from latency of write operations in the asymmetric memory;

a second configuring module that configures a second portion of the asymmetric memory as a reconciled storage for application data units with varying sizes;

a receiving module that receives a first application data unit for writing to the asymmetric memory;

a first computing module that computes a size of the first application data unit and determines that the first application data unit corresponds to a small memory block based on the computed size, wherein a small memory block includes application data units with sizes within a certain size limit;

a first writing module that writes the first application data unit to the temporary storage based on determining that the first application data unit corresponds to a small memory block, wherein the temporary storage includes application data units with sizes corresponding to the small memory block;

a comparing module that:
ascertains an amount of data written to the temporary storage,
compares the amount of data to a pre-determined threshold for writing the application data units stored in the temporary storage to the reconciled storage, and
determines whether the amount of data has reached the threshold; and a second writing module that performs a memory write operation to write at least a portion of the application data units stored in the temporary storage to the reconciled storage based on determining that the amount of data has reached the threshold, and removes the application data units that are written to the reconciled storage from the temporary storage.

2. The system of claim 1, wherein:
the receiving module receives a second application data unit for writing to the asymmetric memory;
the first computing module computes a size of the second application data unit and determines that the second application data unit is larger than a small memory block based on the computed size; and
the third writing module writes the second application data unit directly to the reconciled storage based on determining that the second application data unit is larger than a small memory block.

3. The system of claim 2, wherein:
the receiving module receives a third application data unit for writing to the asymmetric memory;
the first computing module computes a size of the third application data unit and determines that the third application data unit corresponds to a small memory block based on the computed size; and
the first writing module writes the third application data unit to the temporary storage based on determining that the third application data unit corresponds to a small memory block.

4. The system of claim 1, wherein the asymmetric memory includes a flash-based memory system.

5. The system of claim 1, wherein the first configuring module comprises:
a second computing module that computes, at a first time, a first percentage of a total application workload that is performing memory writes for application data units with sizes corresponding to the small memory block; and
a selecting module that selects the first portion of the asymmetric memory as the temporary storage based on computing the first percentage at the first time, wherein a size of the first portion of the asymmetric memory that is selected as the temporary storage is based on the first percentage.

6. The system of claim 5, wherein the second computing module computes, at a second time that is distinct from the first time, a second percentage of the total application workload that is performing memory writes for application data units with sizes corresponding to the small memory block; and
wherein the selecting module selects a third portion of the asymmetric memory as the temporary storage at the second time based on determining that the second percentage is different from the first percentage, wherein a size of the third portion of the asymmetric memory is based on the second percentage and is different from the first portion.

7. The system of claim 6, wherein the third portion of the asymmetric memory that is selected as the temporary storage at the second time includes a portion of the asymmetric memory that was a part of the reconciled storage at the first time.

8. The system of claim 6, comprising:
a reconfiguring module that reconfigures a new portion of the asymmetric memory as the reconciled storage at the second time, including a portion of the asymmetric memory that was a part of the temporary storage at the first time.

9. The system of claim 1, wherein writing the first application data unit to the temporary storage comprises writing the first application data unit to the temporary storage sequentially with other application data units stored in the temporary storage.

10. The system of claim 1, wherein the pre-determined threshold is based on a ratio of an area of the temporary storage storing the application data units and a free area of the temporary storage, and wherein in determining whether the amount of data has reached the threshold, the configuring module determines whether the ratio is greater than a predetermined threshold.

11. The system of claim 1, wherein the logical write unit includes a translation unit, and wherein the translation unit indicates a fixed size at which a logical memory block address is mapped to a physical block number denoting a physical memory location.

12. The system of claim 11, wherein in determining whether the amount of data has reached the threshold, the configuring module determines whether the temporary storage includes application data units that correspond to a complete translation unit.

13. The system of claim 12, wherein the second writing module performs a write operation on a free area of the reconciled storage that has a size same as a translation unit for writing the application data units stored in the temporary storage that correspond to the complete translation unit.

14. The system of claim 1, wherein the temporary storage includes a first redundancy structure for the application data units stored in the temporary storage that is different from a second redundancy structure used for the application data units written to the reconciled storage.

15. The system of claim 14, wherein the first redundancy structure differs from the second redundancy structure in at least one of a replication mechanism used and an amount of redundancy.

16. The system of claim 15, wherein the replication mechanism used is data mirroring or parity encoding.

17. The system of claim 15, wherein the first redundancy structure includes a 1:1 redundancy structure while the second redundancy structure includes one of a 1:4 and a 1:8 redundancy structure.

18. The system of claim 1, wherein the second writing module comprises:
 a determining module that determines, for a first logical write unit, a first portion with a size corresponding to the small memory block includes invalid data while remaining portions of the first logical write unit include valid data, wherein the logical write unit is stored partly in the reconciled storage and partly in the temporary storage;
 an identifying module that identifies an application data unit included in the temporary storage as valid data corresponding to the first portion of the first logical write unit;
 a retrieving module that retrieves the remaining portions of the first logical write unit from the reconciled storage and the temporary storage responsive to identifying the application data unit in the temporary storage;
 a merging module that merges the identified application data unit with the remaining portions of the first logical write unit into a new logical write unit and arranges the data in the new logical write unit in an order that is same as an arrangement of data in the first logical write unit;
 a fourth writing module that writes the data corresponding to the new logical write unit to the reconciled storage and the temporary storage; and
 a removing module that removes the identified application data unit from the temporary storage.

19. The system of claim 18, wherein the fourth writing module writes the data corresponding to the new logical write unit to a free area of the reconciled storage that is different from an area of the reconciled storage that held the first logical write unit.

20. The system of claim 1, wherein the receiving module receives a read request for data that is stored in the asymmetric memory, the modules comprising:
 a first examining module that examines a first translation table that includes information on location of the data in the asymmetric memory;
 a determining module that determines that a first portion of the data is stored in the temporary storage and a second portion of the data is stored in the reconciled storage;
 a second examining module that examines a second translation table that includes information on location of the first portion in the temporary storage;
 a retrieving module that retrieves the first portion of the data from the temporary storage based on the information included in the second translation table, and retrieves the second portion of the data from the reconciled storage based on the information included in the first translation table;
 a combining module that combines the first portion and the second portion to obtain the requested data; and
 a responding module that responds to the read request with the requested data.

21. The system of claim 20, wherein the second translation table is configured to provide information on location of small memory blocks in the temporary storage.

22. The system of claim 21, wherein at least one of the first and second translation tables is stored in dynamic memory that is separate from the asymmetric memory.

23. A method comprising:
 configuring a first portion of an asymmetric memory as a temporary storage for application data units with sizes corresponding to a small memory block that is smaller than the size of a logical write unit associated with the asymmetric memory, wherein latency of read operations is different from latency of write operations in an asymmetric memory;
 configuring a second portion of the asymmetric memory as a reconciled storage for application data units with varying sizes;
 receiving a first application data unit for writing to the asymmetric memory;
 computing a size of the first application data unit;
 based on the computed size of the first application data unit, determining that the first application data unit corresponds to a small memory block, wherein a small memory block includes application data units with sizes within a certain size limit;
 writing the first application data unit to the temporary storage based on determining that the first application data unit corresponds to a small memory block, wherein the temporary storage includes application data units with sizes corresponding to the small memory block;
 ascertaining an amount of data written to the temporary storage;
 comparing the amount of data to a pre-determined threshold for writing the application data units stored in the temporary storage to the reconciled storage;
 determines whether the amount of data has reached the threshold,
 based on determining that the amount of data has reached the threshold, performing a memory write operation on the reconciled storage for writing the application data units stored in the temporary storage to the reconciled storage; and
 removing the application data units that are written to the reconciled storage from the temporary storage.

24. The method of claim 23, wherein the logical write unit includes a translation unit, and wherein the translation unit indicates a fixed size at which a logical memory block address is mapped to a physical block number denoting a physical memory location.

25. The method of claim 24, wherein determining whether the amount of data has reached the threshold comprises:
 determining whether the temporary storage includes application data units that correspond to a complete translation unit.

26. The method of claim 23, comprising:
 receiving a read request for data that is stored in the asymmetric memory;
 examining a first translation table that includes information on location of the data in the asymmetric memory;
 determining that a first portion of the data is stored in the temporary storage and a second portion of the data is stored in the reconciled storage;
 examining a second translation table that includes information on location of the first portion in the temporary storage;

retrieving the first portion of the data from the temporary storage based on the information included in the first translation table;

retrieving the second portion of the data from the reconciled storage based on the information included in the first translation table;

combining the first portion and the second portion to obtain the requested data; and responding to the read request with the requested data.

27. The method of claim 26, wherein the second translation table is configured to provide information on location of small memory blocks in the temporary storage.

28. A system including a non-transitory computer-readable medium storing instructions that are executable by a processor and upon such execution, configured with modules that cause the processor to perform operations, the modules comprising:

a first configuring module that configures a portion of an asymmetric memory as a reconciled storage for application data units with varying sizes, wherein latency of read operations is different from latency of write operations in the asymmetric memory;

a second configuring module that configures a second memory as a temporary storage for application data units with sizes corresponding to a small memory block that is smaller than the size of a logical write unit associated with the asymmetric memory;

a receiving module that receives a first application data unit for writing to the asymmetric memory;

a computing module that computes a size of the first application data unit and determines that the first application data unit corresponds to a small memory block based on the computed size, wherein a small memory block includes application data units with sizes within a certain size limit;

a first writing module that writes the first application data unit to the temporary storage based on determining that the first application data unit corresponds to a small memory block, wherein the temporary storage includes application data units with sizes corresponding to the small memory block; and a comparing module that:
ascertains an amount of data written to the temporary storage,
compares the amount of data to a pre-determined threshold for writing the application data units stored in the temporary storage to the reconciled storage,
determines whether the amount of data has reached the threshold; and a second writing module that performs a memory write operation that writes at least a portion of the application data units stored in the temporary storage to the reconciled storage based on determining that amount of data has reached the threshold, and removes the application data units that are written to the reconciled storage from the temporary storage.

29. The system of claim 28, wherein the second memory includes asymmetric memory.

30. The system of claim 28, wherein the second memory includes a random access memory device that is distinct from the asymmetric memory.

31. A system comprising:

means for configuring a first portion of an asymmetric memory as a temporary storage for application data units with sizes corresponding to a small memory block that is smaller than the size of a logical write unit associated with the asymmetric memory, wherein the asymmetric memory includes memory devices in which latency of read operations is different from the latency of write operations;

means for configuring a second portion of the asymmetric memory as a reconciled storage for application data units with varying sizes; and a non-transitory computer-readable medium storing instructions that are executable by a processor and upon such execution, configured with modules that cause the processor to perform operations, the modules comprising:

a receiving module that receives a first application data unit for writing to the asymmetric memory;

a computing module that computes a size of the first application data unit and determines that the first application data unit corresponds to a small memory block based on the computed size, wherein a small memory block includes application data units with sizes within a certain size limit;

a first writing module that writes the first application data unit to the temporary storage based on determining that the first application data unit corresponds to a small memory block, wherein the temporary storage includes application data units with sizes corresponding to the small memory block; and a comparing module that:
ascertains an amount of data written to the temporary storage,
compares the amount of data to a pre-determined threshold for writing the application data units stored in the temporary storage to the reconciled storage,
determines whether the amount of data has reached the threshold; and a second writing module that performs a memory write operation that writes at least a portion of the application data units stored in the temporary storage to the reconciled storage based on determining that the amount of data has reached the threshold, and removes the application data units that are written to the reconciled storage from the temporary storage.

* * * * *